(12) United States Patent
Mirho

(10) Patent No.: US 10,599,756 B1
(45) Date of Patent: Mar. 24, 2020

(54) PHRASE IDENTIFICATION AND MANIPULATION IN INTEGRATED DRAWING AND WORD PROCESSING ENVIRONMENT

(71) Applicant: TurboPatent Inc., Seattle, WA (US)

(72) Inventor: Charles A Mirho, Lake Oswego, OR (US)

(73) Assignee: TurboPatent Inc., Seattle, WA (US)

( * ) Notice: Subject to any disclaimer, the term of this patent is extended or adjusted under 35 U.S.C. 154(b) by 0 days.

(21) Appl. No.: 15/351,152

(22) Filed: Nov. 14, 2016

Related U.S. Application Data

(60) Provisional application No. 62/255,415, filed on Nov. 14, 2015.

(51) Int. Cl.
| | | |
|---|---|---|
| *G06F 17/00* | (2019.01) | |
| *G06F 17/24* | (2006.01) | |
| *G06F 17/27* | (2006.01) | |
| *G06F 17/21* | (2006.01) | |
| *G06F 3/0482* | (2013.01) | |
| *G06F 3/0486* | (2013.01) | |

(Continued)

(52) U.S. Cl.
CPC ............ *G06F 17/24* (2013.01); *G06F 3/0482* (2013.01); *G06F 3/0486* (2013.01); *G06F 17/218* (2013.01); *G06F 17/274* (2013.01); *G06F 17/2705* (2013.01); *G09G 5/22* (2013.01); *G06T 11/206* (2013.01); *G06T 2200/24* (2013.01)

(58) Field of Classification Search
CPC .......................... G06F 17/2785; G06F 17/271
See application file for complete search history.

(56) References Cited

U.S. PATENT DOCUMENTS 5,774,833 A * 6/1998 Newman ............... G06F 17/211
 704/9
7,673,251 B1 * 3/2010 Wibisono ............... G06F 9/451
 715/771

(Continued)

OTHER PUBLICATIONS

Font Rasterization from Wikipedia, retrieved from https://en.wikipedia.org/wiki/Font_rasterization, Internet Archive captured Nov. 6, 2015.*

*Primary Examiner* — Scott T Baderman
*Assistant Examiner* — Barbara M Level
(74) *Attorney, Agent, or Firm* — Rowan TELS LLC

(57) ABSTRACT

A method of tracking and propagating changes and modifications to tagged text terms across document sections and graphical document sections in a graphical user interface (GUI) includes displaying a primary document section window, in the GUI, containing a text node edit control with text node text; capturing at least one text term, from the text node text and graphically differentiating each instance of the text term in editable text environments of the GUI; displaying the text term as a term entry, in a tagged terms panel of the GUI; displaying at least one suggested text term in a suggestion panel, for a partial term entry in the editable text environments; replacing the partial term entry with the tagged term from the suggestion panel; displaying the text term, in an editable format, in a terms editor menu; and replacing the text term with a modified text term for each instance of the tagged term in the editable text environments, in response to receiving the modified text term through the terms editor menu.

15 Claims, 21 Drawing Sheets

(51) Int. Cl.
*G09G 5/22* (2006.01)
*G06T 11/20* (2006.01)

(56) References Cited

U.S. PATENT DOCUMENTS

| | | | | |
|---|---|---|---|---|
| 2009/0210828 A1* | 8/2009 | Kahn | .................... | G06F 17/241 |
| | | | | 715/854 |
| 2009/0228777 A1* | 9/2009 | Henry | ............... | G06F 17/30017 |
| | | | | 715/230 |
| 2013/0332812 A1* | 12/2013 | Houston | ............. | G06F 17/2725 |
| | | | | 715/230 |
| 2015/0339269 A1* | 11/2015 | Konchitsky | ........... | G06F 17/212 |
| | | | | 715/211 |

* cited by examiner

PHRASE IDENTIFICATION AND MANIPULATION IN INTEGRATED DRAWING AND WORD PROCESSING ENVIRONMENT

BACKGROUND

Maintaining consistent terminology throughout a technical document (e.g. research reports, journal article, engineering manual, etc.) is difficult to achieve especially when the document contain a variety of formats (e.g. engineering drawings, tables, flow charts diagrams, charts, graphs, etc.) Existing word processing programs have simple functions for maintaining consistent terminology. Unfortunately these functions are limited to sections of the document created in the word processor. These functions generally require a user to enter a string of characters to identify in the document and a string of characters to replace the identified string of characters. These functions are indiscriminate in their operation and routinely replace a string of characters within a word.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
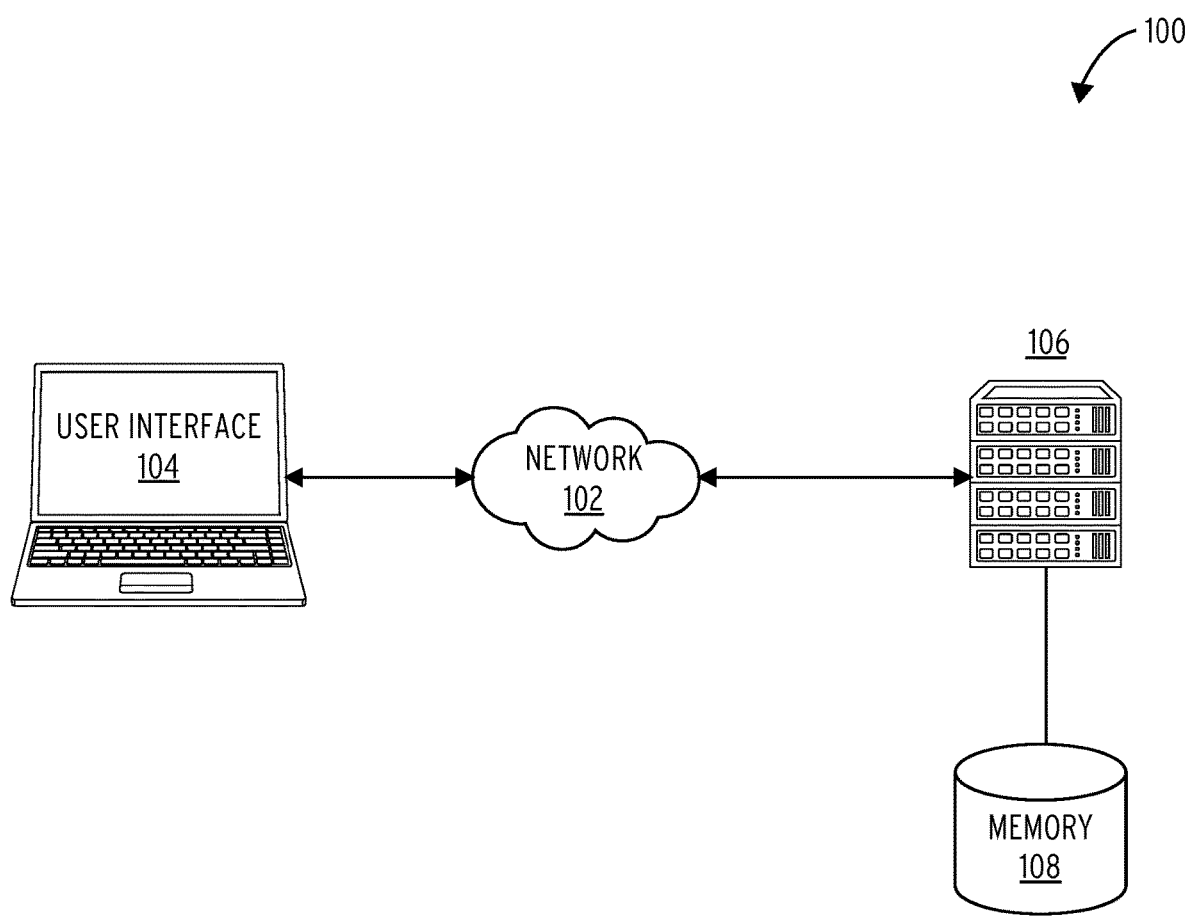
FIG. 1 illustrates an embodiment of a system environment 100.

A method of tracking and propagating changes and modifications to tagged text terms across document sections and graphical document sections in a graphical user interface (GUI) may include displaying a primary document section window with a text node edit control within the GUI, comprising text node text with at least one text term, wherein the text node edit control is text node editor. The method may store a text term as a new tagged text node within a tagged term allocation of memory in a controlled memory data structure in response to receiving a tag request through the text node edit control. The method configures a parser with the new tagged text node to parse the text node text stored in a document section allocation of memory and drawing section allocation of memory within the controlled memory data structure, for text terms matching the new tagged text node; The parser transforms memory sectors associated with matching text terms within the text node text with a modifier value to identify tagged terms through control of a memory controller.

A display device may render the text node text stored within the document section allocation of memory and the drawing section allocation of memory through the text node editor in the GUI with modified pixel channel values for the tagged terms. The GUI may display a tagged terms panel, comprising the text terms associated with tagged text nodes stored within the tagged term allocation of memory as tagged entries.

A tagged term editor may display the tagged text nodes associated with a particular text term in response to receiving an edit request through the tagged terms panel for the particular text term. The text term of a particular tagged term in the text node text stored in the controlled memory data structure may be replaced with a new text term in response to receiving the new text term through the tagged term editor for a tagged text node associated with the particular tagged term. A first comparator may store the text node text from the text node editor to the controlled memory data structure, in response to detecting changes to the text node text from a perviously stored version.

Term suggestion logic may be operated to detect a partial term entry in the changes to the text node text from a previously stored version; compare the partial term entry to the text terms associated with the tagged text nodes through control of a second comparator; and display a suggestion panel comprising at least one suggested text term in the text node editor, in response to detecting the text terms of the tagged text nodes above a preconfigured similarity threshold in comparison to the partial term entry.

A tagged term may be added to the text node text in the text node editor in response to receiving a selection input for a suggested text term in the suggestion panel.

A method of tracking and propagating changes and modifications to tagged text terms may include configuring the parser with the text terms of the tagged text nodes to identify the text terms in a secondary document section and the graphical document sections of a multiformat document stored within the controlled memory data structure as text term locations for each tagged term. The method may operate term locator logic to: configure a switch to select graphical indicators comprising a secondary document location status and a graphical document location status for each of the text term locations received from the parser; and display a graphical indicator in the tagged terms panel proximal to the text terms associated with the tagged text nodes.

The method of tracking and propagating changes and modifications to tagged text terms may include operating a natural language processing engine to identify new text terms in the text node text displayed within the text node edit control to store as new tagged text nodes, in response to receiving a selection input for a find and tag terms option displayed in the primary document section window.

A method of tracking and propagating changes and modifications to tagged text terms across document sections and graphical document sections in a graphical user interface (GUI) may include generating a flow chart drawing element in a drawing canvas panel from a drag and drop input of a first selected text term from the tagged terms panel in response to a natural language processing engine interpreting the first selected text term as a verb phrase; and generating a system diagram drawing element in the drawing canvas panel from a drag and drop input of a second selected text term from the tagged terms panel, in response to the natural language processing engine interpreting the second selected text term a noun phrase.

The character glyphs are vectorized graphics representing textual characters. Each character glyphs may represent at least one unicode character and may comprise features dictating how the glyph is rendered. Character glyphs may serve as an intermediary between the stored data and rasterized text in a graphic rendering pipeline. Character glyphs may be retrieved from a glyph library such as texture atlas.

The display parameters may include display properties affecting rendering and positioning of graphical objects through a GUI displayed on a display device. The display parameters may include styling and formatting behavior for rendering text within an editable text environment (e.g., character cell size, kerning, line spacing, and etc.,)

The document section allocation of memory may operate as storage location within the controlled memory data structure comprising a primary document section and secondary document sections. The primary document sections and secondary document section comprise text node text that may be rendered within a text node edit control and a text node editor.

The drawing canvas panel within the drawings tool window may include features facilitating viewing and editing of a graphical document section. The graphical document section includes drawing elements that may be text and/or graphics. The drawing canvas panel may include features to add, remove, resize, rotate, reposition, and layer drawing elements within the drawing canvas panel. The drawing canvas panel may include features to link drawing elements to indicate directionality in a process or relationships in a diagram.

The drawing element text node text may include text displayed with the drawing element in the drawing canvas panel. The drawing element text node text displayed in the drawing canvas panel may be linked to a second set of text node text that includes a reference of the displayed drawing element text in text node text of the secondary document section.

The drawing section allocation of memory may operate as a location within the controlled memory data structure that comprises graphical document sections. The graphical drawing sections may each represent a collection of drawing elements that are displayed within a drawing canvas panel in the drawings tool window. The graphical drawing sections may include drawing elements with a coordinate position within the drawing canvas and text node text to be displayed with the drawing element or function as a reference to the drawing element within a document section of a multiformat document. The edit request may operate as an input received through the tagged term panel for tagged term to launch or open a tagged term editor.

The find and tag terms option may operate as a graphical object within a window of a GUI to activate a natural language processing engine to identify potential tagged terms from the text terms in a text node text of a primary document section. The find and tag terms option may add text terms to the tagged terms allocation of memory which may operate the parser to identify and tag matching text terms within text node text in the secondary document sections and the graphical document sections.

The graphical indicator may operate as a graphical objects displayed through the tagged terms the panel indicating whether a tagged term is found within the text node text of secondary document sections and graphical document sections. The graphical indicator may comprise graphical document location status and a document section location status. The graphical modifier may include instructions or parameters dictating the visualization of the graphical tag for a tagged term. The graphical modifier and the display parameters may be utilized to configure a filter to modify color channel values. The memory controller may operate as a logic unit or circuit for handling or manipulating data stored within the controlled memory data structure. The constructor may include features to assemble and arrange the character glyphs in a text node editor utilizing the display parameters.

The modified pixel channel values may include the pixel values associated with rasterized character glyphs as well as the pixel channel values associated with the character cells in which the rasterized glyphs are rendered in. The modifier value may include a data value that transform data or appends information to existing data found in the controlled memory data structure. The multi-format document may operate as a collection of related document section comprising a primary document section, secondary document sections, and graphical document sections stored within the controlled memory data structure.

The noun phrase may include terms interpreted by a natural language processing engine for their lexical meaning or contextual meaning within the text node text. The partial term entry may operate as a set of text characters viewed in context within a string utilized in the determination of a suggested text term in the suggestion panel. The preconfigured similarity threshold may operate as a limit for which a similarity value generate during comparison of the characters and context of a partial term entry matches a text term of a tagged text node within the tagged terms panel. The system diagram drawing element may operate drawing elements utilized in system diagrams (e.g., database, processor, memory, server, client device, etc.,). The flow chart drawing element may operate as drawing elements used in flow chart diagram (e.g., decision blocks, process blocks, subroutine blocks, etc.,). The flow chart drawing element may be selected for a verb phrase identified by a natural language processing engine. A drag and drop input may operate a GUI feature for moving graphical objects between windows through a mechanism. The filter may operate to filter pixel channel values associated with tagged terms by reducing or increasing pixel channels or the color values displayed while displaying the associated text.

The tag request may operate as an input received through the text node edit control to identify and add text terms to the tagged term allocation of memory. The tagged entries may include the text terms displayed through the tagged terms panel. The tagged term may include a text term and visual indicator displayed through a text node editor for a text term matching a tagged text node. The tagged term allocation of memory may operate as the storage location of tagged text nodes within the controlled memory data structure. The tagged term editor may operate as a text node editor for tagged text nodes. The tagged terms panel may operate as a graphical object displayed text terms associated with tagged text nodes stored within the tagged term allocation of memory associated with a multi-format document. The tagged text node may operate as a storage object for text terms for tagging, identification, and manipulation within a multi-format document.

The term locator logic may operate as logic or process to identify presence of a text term from the tagged term allocation of memory in the secondary document sections and graphical document section of a multi-format document. The term suggestion logic may operate as logic or process to compare a partial term entry with text terms stored within tagged text nodes in the tagged term allocation of memory. The text node edit control may operate as a text node editor for the primary document section with functionality to select text terms from a text node text as tagged terms. The text node editor may include the functionality of an editable text environment or word processing environment to receive and display text input. The text node text may include Unicode character data stored in memory with additional properties.

The text term may include a combination text characters stored within text node text carrying a lexical meaning in the context of the text node text of the primary document section, secondary document section, and graphical document section. The verb phrase may include lexical terms interpreted by the natural language processing engine as identifying a particular action or event occurring in isolation or in context of other terms within the text node text of the primary document section.

A method of tracking and propagating changes and modifications to tagged text terms across document sections and graphical document sections in a graphical user interface (GUI) may include displaying a primary document section window, in the GUI, containing a text node edit control with text node text comprising at least one text term. A text term, of the at least one text term, may be captured from the text node text and each instance of the text term in the editable text environments may be graphically differentiated in the GUI with a visual tag. The text term may be displayed as a term entry, in a tagged terms panel of the GUI. At least one suggested text term may be displayed in a suggestion panel, for a partial term entry in the editable text environments and the partial term entry may be replaced with the tagged term corresponding to a selected suggested text term in the suggestion panel. The text term may be displayed in an editable format in a terms editor menu in response to receiving an edit request for the term entry through the tagged terms panel. The text term may be replaced with a modified text term for each instance of the tagged term in the editable text environments, in response to receiving the modified text term through the terms editor menu. The text node edit control may operate similarly to an editable text environment.

The visual tag may be associated with a transform of the text term as a tagged term in the editable text environments. The selection input of a particular text term transforms the particular text term into the first selected text term. The tagged terms panel appends the term entry for each of the text terms captured.

The process of capturing the text term from the text node text may include displaying a menu panel, in the GUI, comprising a capture term option for a first selected text term in the text node text, capturing the first selected text term from the text node text and graphically differentiating each instance of the first selected text term in the editable text environments with the visual tag, in response to receiving the selection input for the capture term option in the menu panel. The process may further include displaying the first selected text term in the tagged terms panel as a corresponding term entry.

The process of capturing the text term from the text node text may include displaying a find and tag terms option within the primary document section window, capturing the text term entities from the text node text and graphically differentiating each instance of the text term entities in the editable text environments with the visual tag, in response to receiving a selection input for the find and tag terms option. The process may further include displaying the text term entities in the tagged terms panel as term entries. The selection of the find and tag terms option activates a natural language processing engine that parses through the text node text and identifies the text terms as text term entities.

The method may include displaying the term entry with a first visual tag in the tagged terms panel in response to the tagged term being absent in the editable text environments of a specifications window and a drawings tool window. The tagged terms panel displays the term entry with a second visual tag in response to the tagged term being present in the editable text environments of the drawings tool window, but absent in the editable text environments of the specifications window. The tagged terms panel displays the term entry with a third visual tag in response to the tagged term being present in the editable text environments of the specifications window but absent in the editable text environments of the drawings tool window. The tagged terms panel displays the term entry with a fourth visual tag in response to the tagged term being present in the editable text environments of the specifications window and the drawings tool window.

The method may include displaying the tagged terms panel within a drawings tool window adjacent to a drawing canvas panel. The drawing canvas panel generates a flow chart drawing element in response to a drag and drop input of a verb text term from the tagged terms panel. The drawing canvas panel generates a system diagram drawing element in response to the drag and drop input of a noun phrase term entry from the tagged terms panel.

The process of generating flow chart drawing elements may includes the drag and drop input of the term entry activates a natural language processing engine to interpret the term entry as a verb phrase. The process of generating the system diagram drawing element may includes the drag and drop input of the term entry activates the natural language processing engine to interpret the term entry as a noun phrase.

The method may include displaying a current text node edit control and at least one alternate text node edit control in the primary document section window; and/or displaying the tagged terms panel comprising a current terms list and another terms list.

The primary document section window may display the editable text environments for the current text node edit control and at least one alternate text node edit control representing separate text node trees.

The tagged terms panel may include the current terms list comprises term entries in the current text node edit control while the other terms list comprises the term entries found exclusively in alternate text node edit control.

The method method may include displaying a drawings tool window with a drawing canvas panel comprising at least one drawing element in the GUI. The drawings tool window displays an element inspector panel for a drawing element in response to a selection input for the drawing element. The editable text environments of the element inspector panel displays the suggestion panel with the at least one suggested text term for the partial term entry. The partial term entry is replaced with the tagged term corresponding to the selected suggested text term in the suggestion panel. The tagged term is displayed coincident with the drawing element in the drawing canvas panel.

The removal of the term entry from the tagged terms panel removes the visual tag from the text term. The suggestion panel is displayed for the partial term entry in the text node edit control of a specifications window in the GUI.

Referencing FIG. 1, a system environment 100 comprises a user interface 104 communicably coupled to a server 106 by way of a network 102. The server 106 further comprises memory 108. This system environment 100 may be operated in accordance with the methods disclosed herein.

Figure 2:
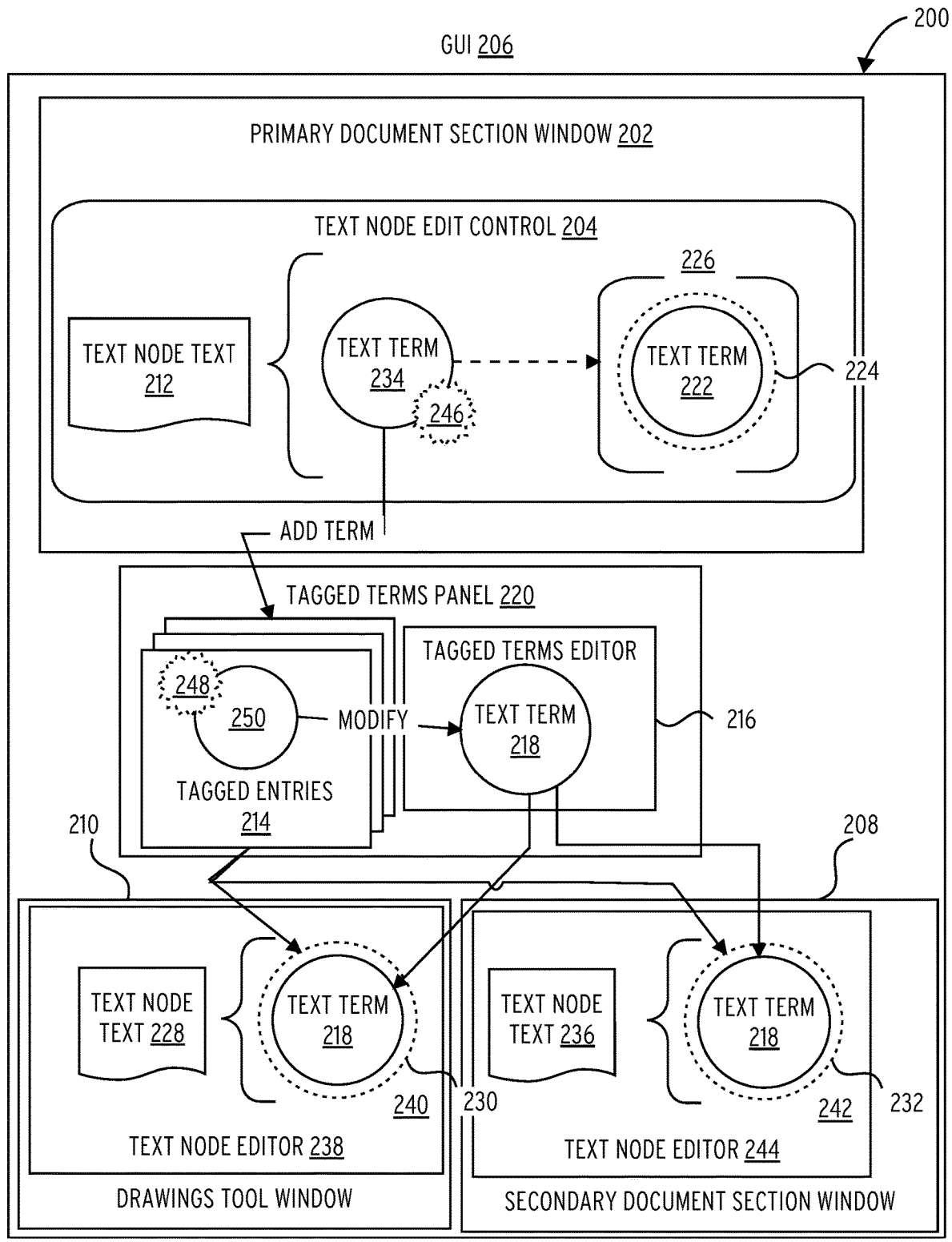
FIG. 2 illustrates an aspect of the subject matter in accordance with one embodiment.

FIG. 2 illustrates and embodiment of a system for tracking and propagating changes and modifications to tagged text terms 200. The system for tracking and propagating changes and modifications to tagged text terms 200 comprises a GUI 206. The GUI 206 comprises a primary document section window 202, a tagged terms panel 220, a drawings tool window 210, and a secondary document section window 208. The primary document section window 202 comprises a text node edit control 204. The text node edit control 204 comprises text node text 212 comprising a text term 234 and a tagged term 226. The tagged term 226 comprises a visual tag 224 and a text term 222. The text term 234 is transformed into a tagged term 226 after a tag request 246 is received in GUI 206. The tagged terms panel 220 comprises a tagged entries 214 and displays a tagged terms editor 216. Each tagged entry comprises a stored text term 250. The stored text term 250 is transformed into a new text term 218 through the tagged terms editor 216 after an edit request 248 is received through the GUI 206. The tagged terms editor 216 comprises a new text term 218 to replace the stored text term 250. The drawings tool window 210 comprises a text node editor 238 displaying text node text 228 comprising a tagged term 240 comprising the new text term 218 with a visual tag 230. The secondary document section window 1914 (deleted) comprises a text node editor 244 displaying a text node text 236 comprising a tagged term 242 comprising the new text term 218 with a visual tag 232. The system for tracking and propagating changes and modifications to tagged text terms 200 may be operated in accordance with the process described in FIG. 3, FIG. 5, FIG. 7, FIG. 10, FIG. 12, FIG. 14, FIG. 16, and FIG. 18.

Figure 3:
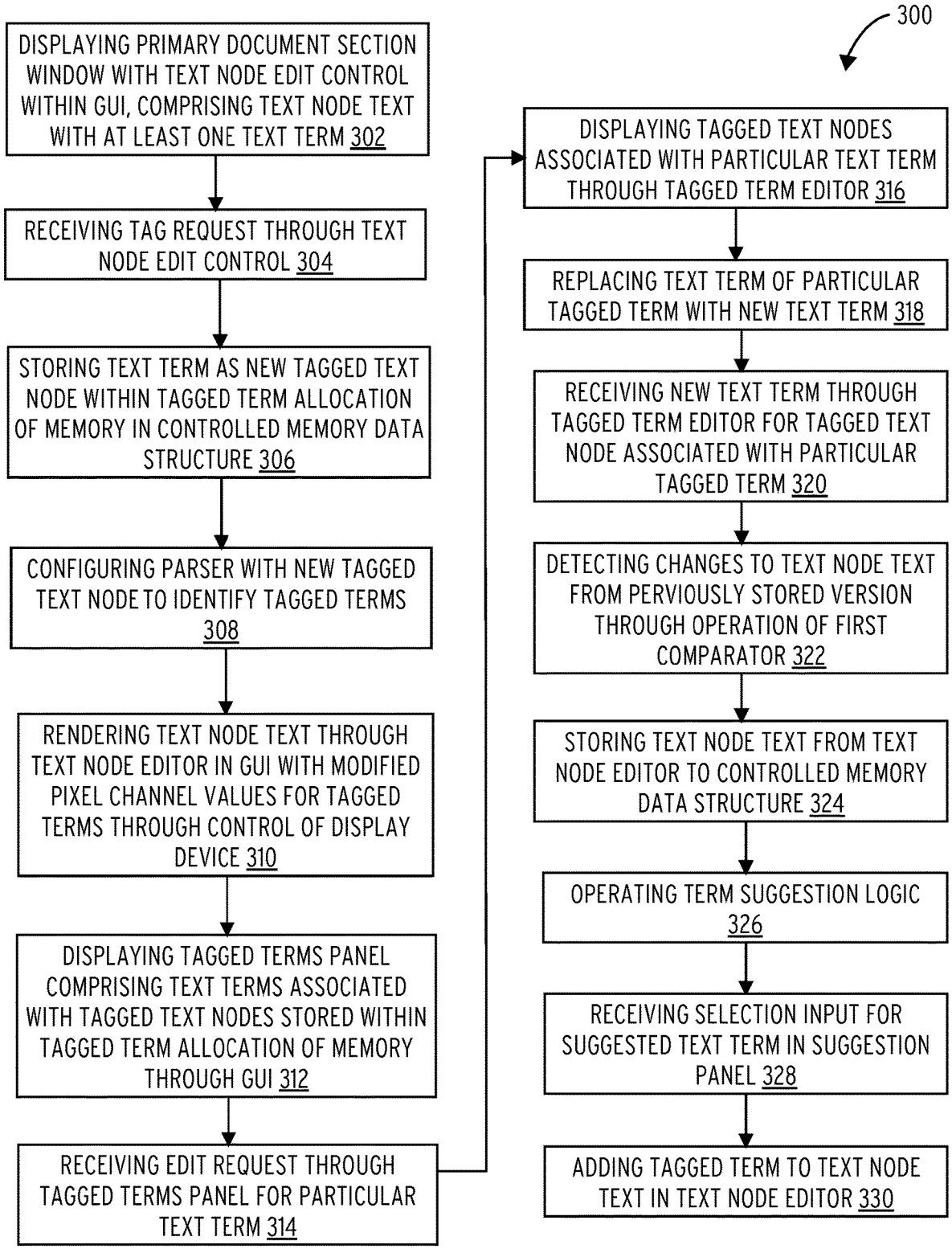
FIG. 3 illustrates an an embodiment of a method of tracking and propagating changes and modifications to tagged text terms 300.

Referencing FIG. 3, the method of tracking and propagating changes and modifications to tagged text terms 300 displays a primary document section window with a text node edit control within the GUI, comprising text node text with at least one text term, wherein the text node edit control is text node editor (block 302). The method of tracking and propagating changes and modifications to tagged text terms 300 receives a tag request through the text node edit control (block 304). The text node edit control stores a text term as a new tagged text node within a tagged term allocation of memory in a controlled memory data structure (block 306). The text node edit control configures a parser with the new tagged text node to identify tagged terms stored in a document section allocation of memory and drawing section allocation of memory within the controlled memory data structure (block 308). The GUI renders the text node text stored within the document section allocation of memory and the drawing section allocation of memory through the text node editors with modified pixel channel values for the tagged terms through control of a display device (block 310). The GUI displays a tagged terms panel, comprising the text terms associated with tagged text nodes stored within the tagged term allocation of memory as tagged entries (block 312). The tagged terms panel receives an edit request for the particular text term (block 314). The GUI displays the tagged text nodes associated with a particular text term through a tagged term editor (block 316). The tagged term editor receives the new text term for a tagged text node associated with the particular tagged term (block 318). The tagged term editor replaces the text term of a particular tagged term in the text node text stored in the controlled memory data structure with a new text term (block 320). A first comparator detects changes to the text node text from a perviously stored version (block 322). The first comparator stores the text node text from the text node editor to the controlled memory data structure (block 324). The method of tracking and propagating changes and modifications to tagged text terms 300 operates term suggestion logic (block 324). The suggestion panel receives a selection input for a suggested text term (block 326). The term suggestion logic adds a tagged term to the text node text in the text node editor (block 328).

Figure 4:
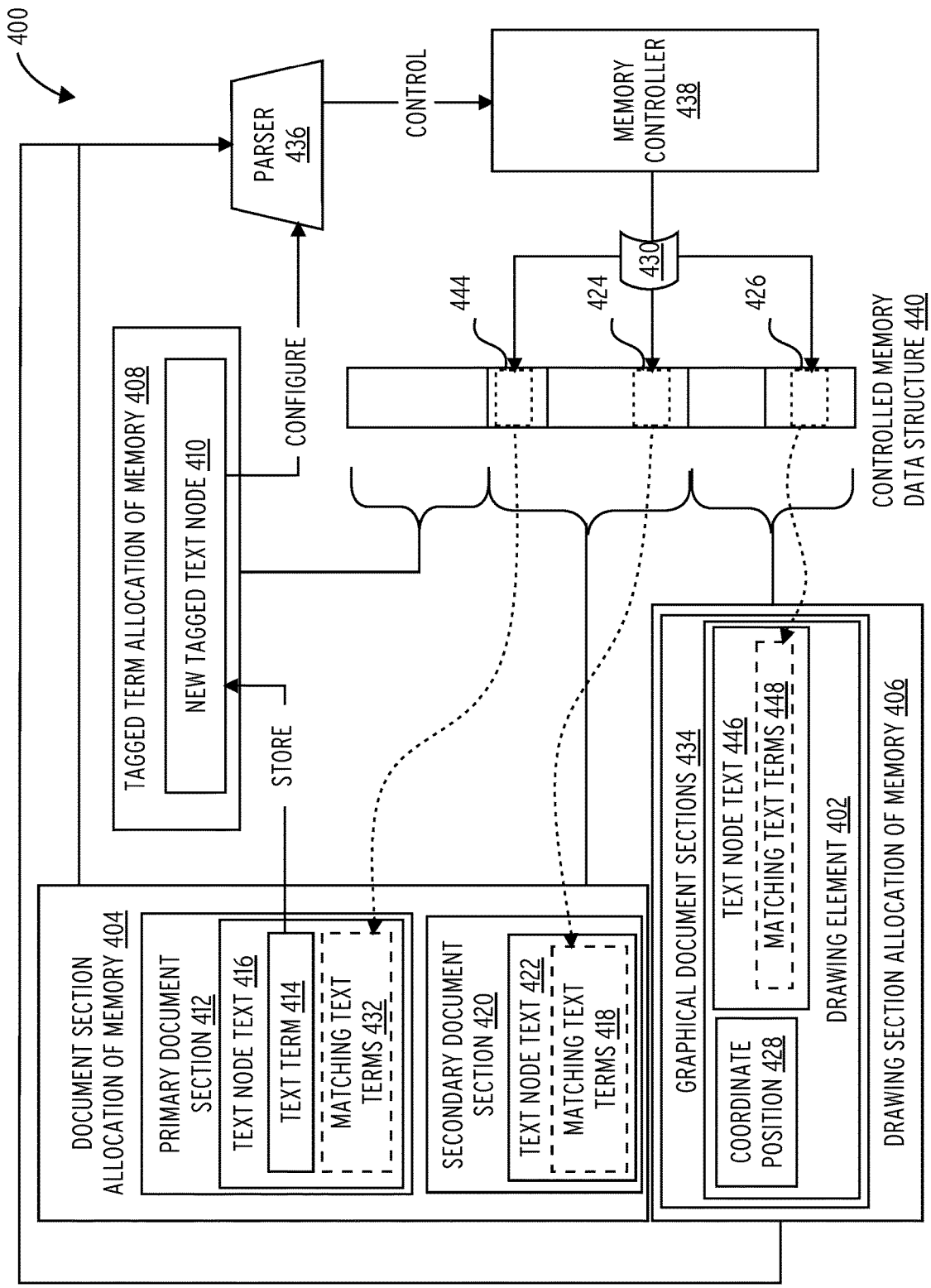
FIG. 4 illustrates an embodiment of a system for tracking and propagating changes and modifications to tagged text terms 400.

Referencing FIG. 4, a system for tracking and propagating changes and modifications to tagged text terms 400 comprises a controlled memory data structure 440, a parser 436, and a memory controller 438. The controlled memory data structure 440 comprises a document section allocation of memory 404, a drawing section allocation of memory 406, and a tagged term allocation of memory 408. The document section allocation of memory 404 comprises a primary document section 412 and a secondary document section 420. The primary document section 412 comprises a text node text 416 comprising a text term 414 and matching text terms 432. The secondary document section 420 comprises a text node text 422 comprising matching text terms 418.

The drawing section allocation of memory 406 comprises graphical document sections 434 comprising at least one drawing element 402. The drawing element 402 comprises a coordinate position 428 and a text node text 446 comprising a matching text terms 448. The tagged term allocation of memory 408 comprises a new tagged text node 410. The memory controller 438 applies a modifier value 430 to memory sectors 444, memory sectors 424, and memory sectors 426 associated with matching tagged terms. The system for tracking and propagating changes and modifications to tagged text terms 400 may be operated in accordance with the process described in FIG. 5.

Figure 5:
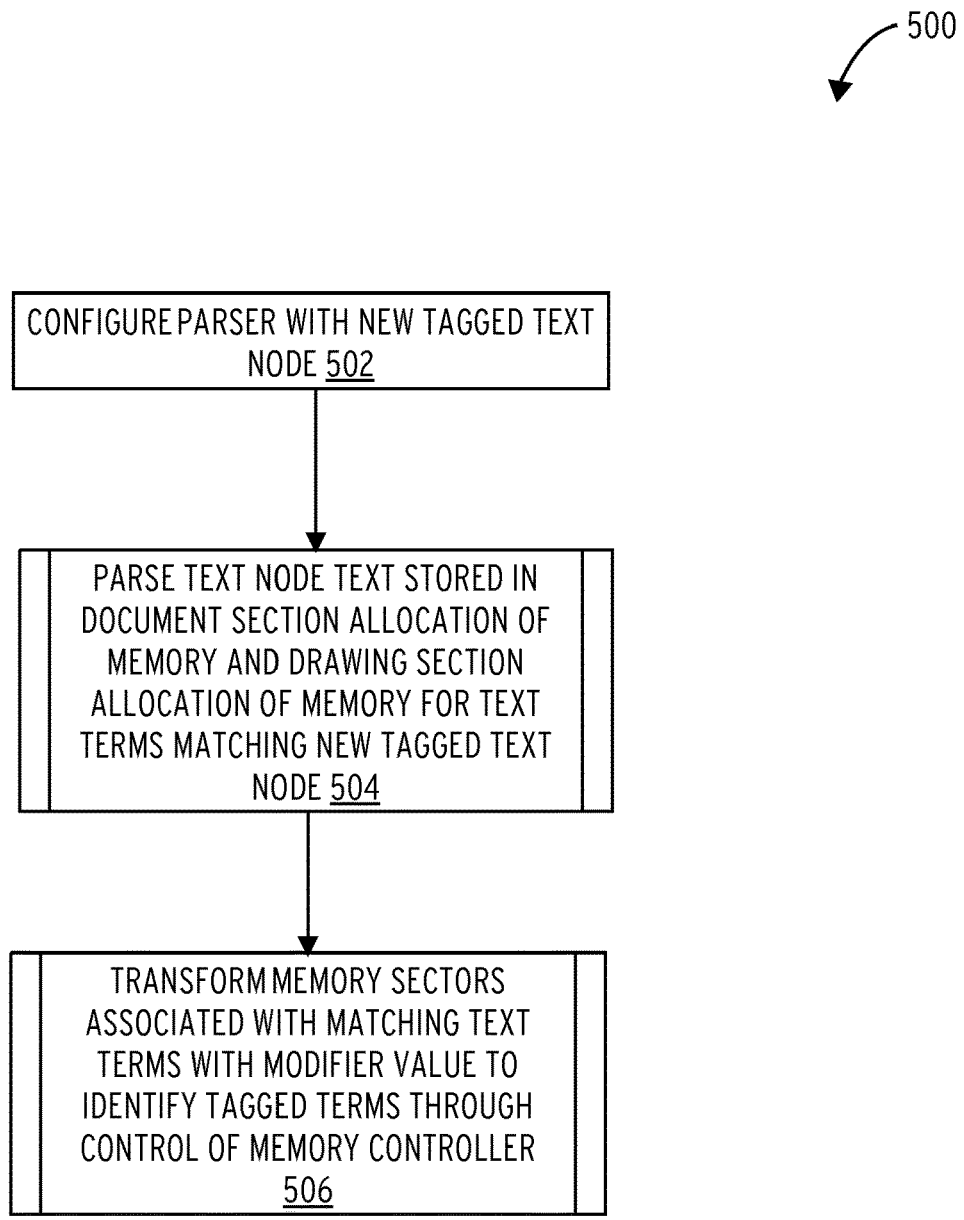
FIG. 5 illustrates an embodiment of a method of tracking and propagating changes and modifications to tagged text terms 500.

Referencing FIG. 5, a method of tracking and propagating changes and modifications to tagged text terms 500 configures a parser with the new tagged text node (block 502). The parser parses the text node text stored in a document section allocation of memory and drawing section allocation of memory within the controlled memory data structure, for text terms matching the new tagged text node (block 504). A memory controller transforms memory sectors associated with matching text terms within the text node text with a modifier value to identify tagged terms (block 506).

Figure 6:
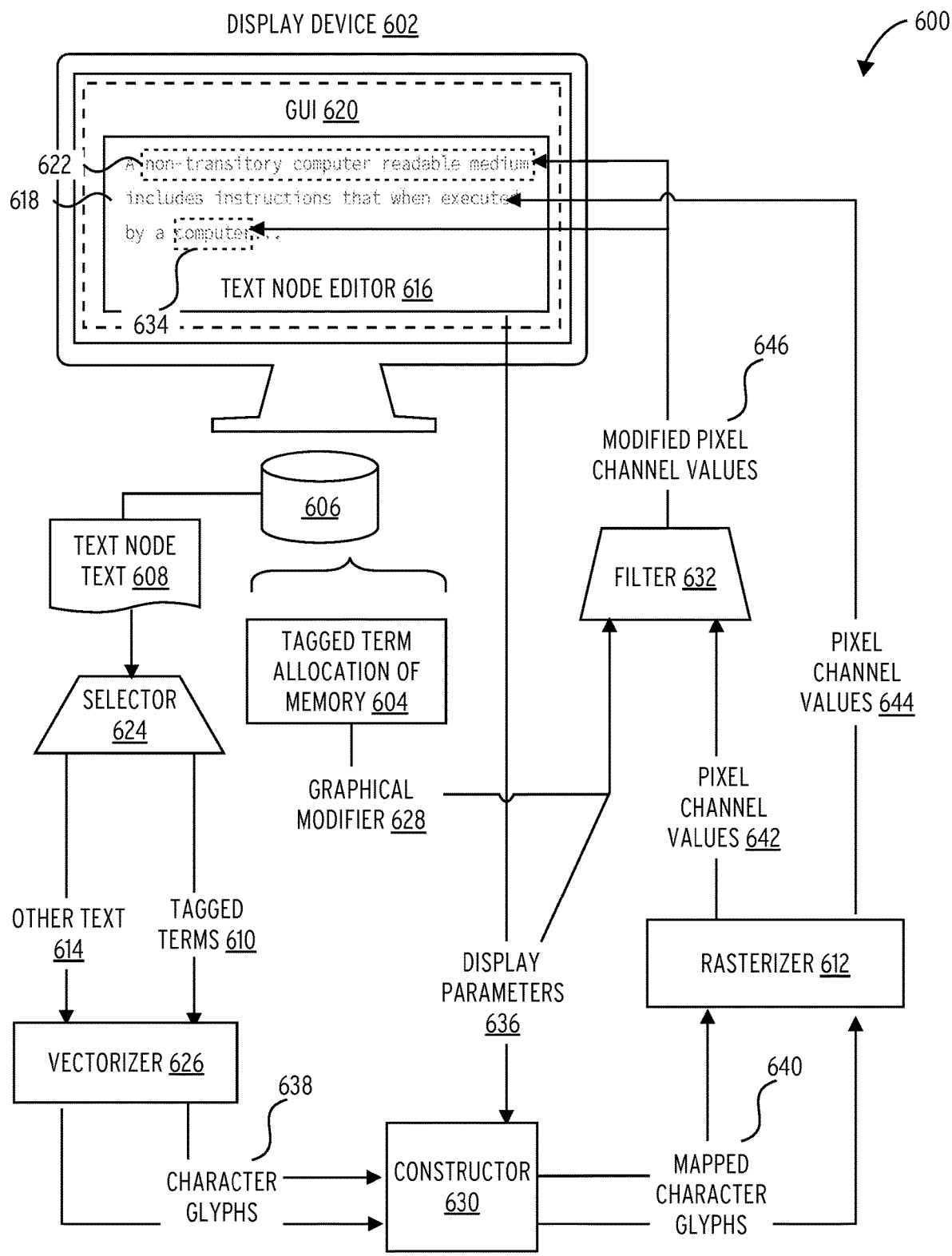
FIG. 6 illustrates an an embodiment of a system for tracking and propagating changes and modifications to tagged text terms 600.

Referencing FIG. 6, a system for tracking and propagating changes and modifications to tagged text terms 600 comprises a display device 602, a controlled memory data structure 606, a selector 624, a vectorizer 626, a constructor 630, a rasterizer 612, and a filter 632. The display device 602 displays a GUI 620 comprising a text node editor 616. The text node editor 616 displays text node text 618 with graphically modified term 622 and a graphically modified term 634. The controlled memory data structure 606 comprises text node text 608 and a tagged term allocation of memory 604 comprising graphical modifier 628. The text node text 608 comprises a tagged terms 610 and other text 614. The vectorizer 626 generates character glyphs 638. The constructor 630 receives display parameters 636 and character glyphs 638 to generate mapped character glyphs 640. The rasterizer 612 generates pixel channel values 642 and pixel channel values 644. The filter 632 generates modified pixel channel values 646 from the graphical modifier 628, the display parameters 636, and the pixel channel values 642. The system 600 may be operated in accordance with the process described in FIG. 7.

Figure 7:
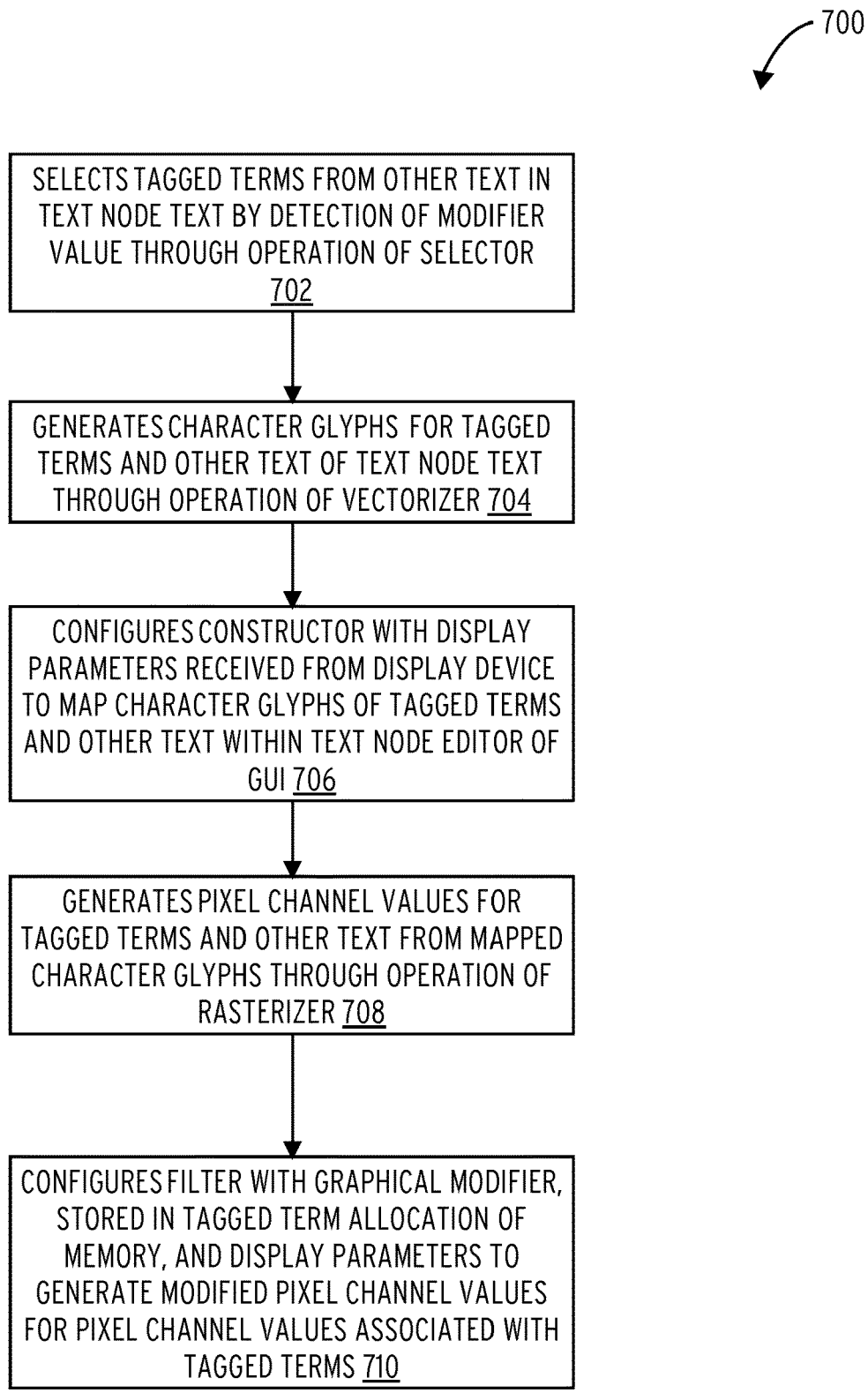
FIG. 7 illustrates an embodiment of a method of tracking and propagating changes and modifications to tagged text terms 700.

Referencing FIG. 7, a method of tracking and propagating changes and modifications to tagged text terms 700 operates a selector to select the tagged terms from other text in the text node text by detection of the modifier value (block 702). The vectorizer generates character glyphs for the tagged terms and the other text of the text node text (block 704). The method of tracking and propagating changes and modifications to tagged text terms 700 configures a constructor with display parameters received from the display device to map the character glyphs of the tagged terms and the other text within the text node editor of the GUI (block 706). A rasterizer generates pixel channel values for the tagged terms and the other text from mapped character glyphs (block 708). The method of tracking and propagating changes and modifications to tagged text terms 700 configures a filter with a graphical modifier, stored in the tagged term allocation of memory, and the display parameters to generate the modified pixel channel values for the pixel channel values associated with the tagged terms (block 710).

Figure 8:
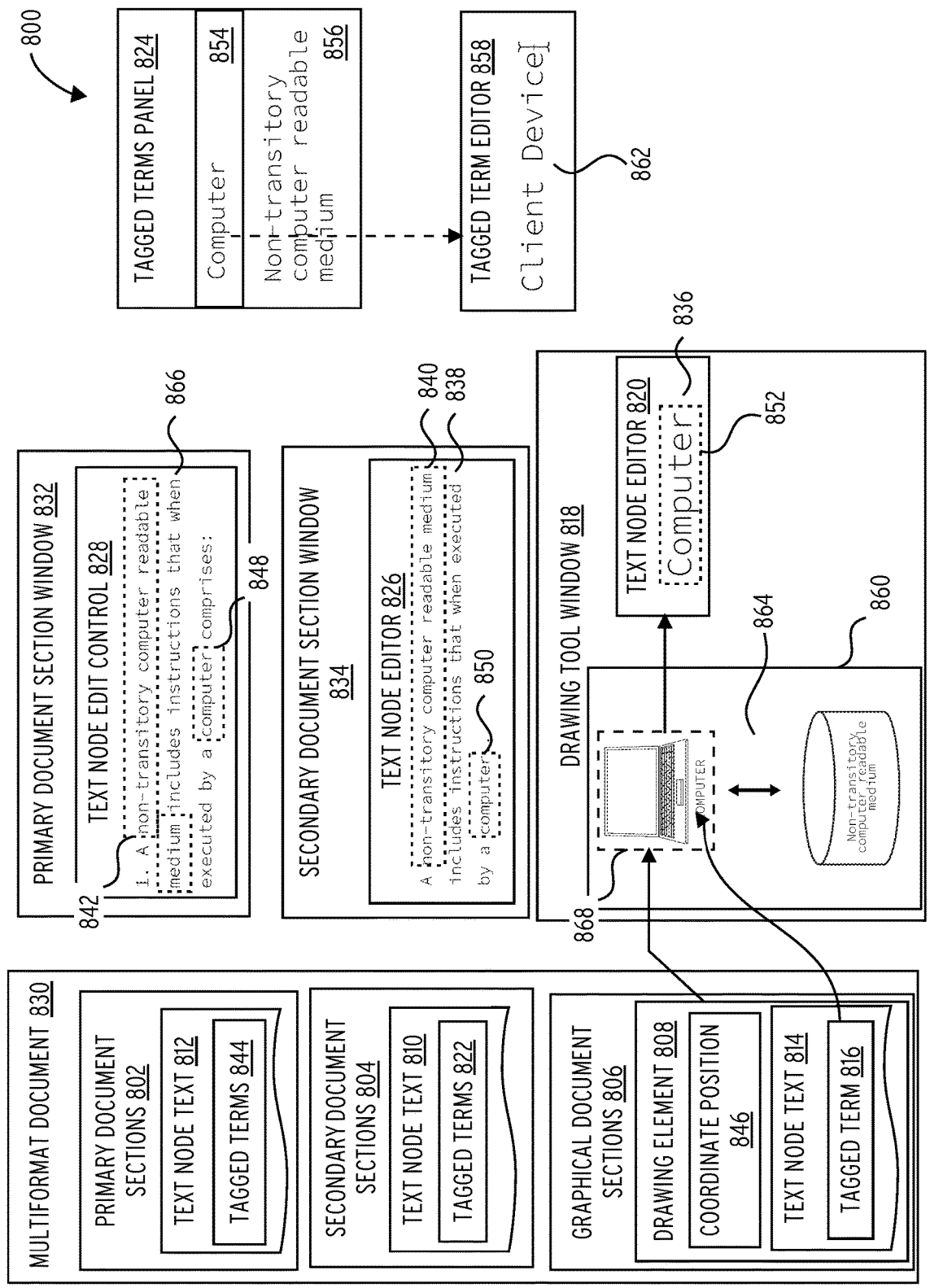
FIG. 8 illustrates an embodiment of a system for tracking and propagating changes and modifications to tagged text terms 800.

Referencing FIG. 8, a system for tracking and propagating changes and modifications to tagged text terms 800 comprises a multiformat document 830, displayed through a GUI comprising a primary document section window 832, a secondary document section window 834, a drawing tool window 818, a tagged terms panel 824, and a tagged term editor 858. The multiformat document 830 comprises a primary document sections 802, a secondary document sections 804, and graphical document sections 806. The primary document sections 802 comprises a text node text 812 comprising tagged terms 844. The secondary document sections 804 comprises a text node text 810 comprising tagged terms 822. The graphical document sections 806 comprises drawing element 808 comprising a coordinate position 846 and a text node text 814 comprising a tagged term 816. The primary document section window 832 comprises a text node edit control 828 displaying a primary document section text node text 866 comprising graphically differentiated tagged term 842 and graphically differentiated tagged term 848. The secondary document section window 834 a text node editor 826 displaying a secondary document section text node text 838 comprising graphically differentiated tagged term 840 and graphically differentiated tagged term 850. The drawing tool window 818 comprises a text node editor 820 and drawing canvas panel 860. The drawing canvas panel 860 comprises a rendered graphical document 864 comprising a drawing element 868. The text node editor 820 comprises a drawing element text node text 836 comprising a graphically differentiated tagged term 852. The tagged terms panel 824 comprises a text term associated with tagged text node 854 and a text term associated with tagged text node 856. The tagged term editor 858 receives a new text term 862. The system for tracking and propagating changes and modifications to tagged text terms 800 may be operated in accordance with the processes described in FIG. 3 and FIG. 10.

Figure 9:
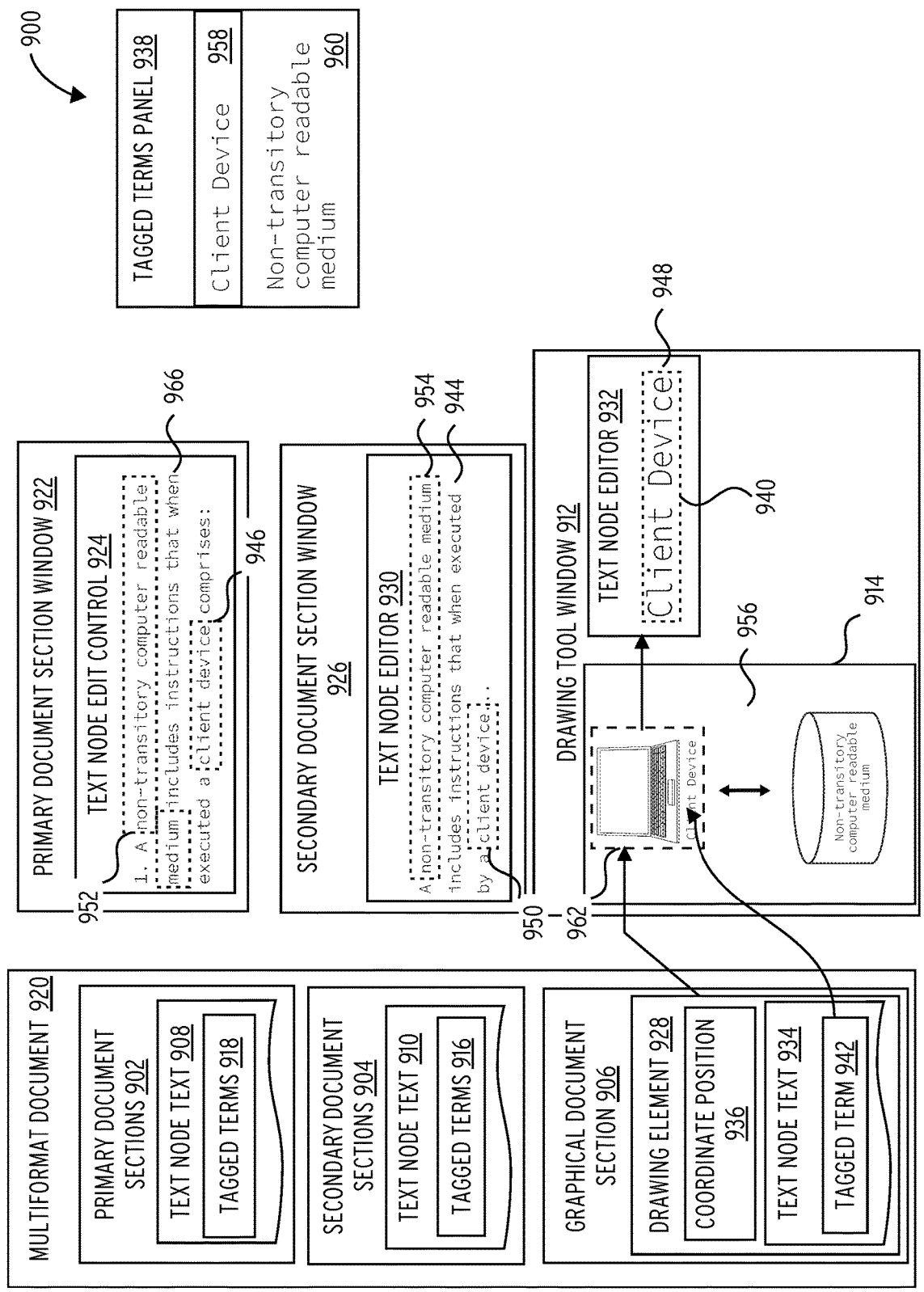
FIG. 9 illustrates an embodiment of a system for tracking and propagating changes and modifications to tagged text terms 900.

Referencing FIG. 9, a system for tracking and propagating changes and modifications to tagged text terms 900 comprises a multiformat document 920 displayed through a GUI comprising a primary document section window 922, a secondary document section window 926, a drawing tool window 912, and a tagged terms panel 938. The multiformat document 920 comprises a primary document sections 902, a secondary document sections 904, and a graphical document section 906. The primary document sections 902 comprises a text node text 908 comprising tagged terms 918. The secondary document sections 904 comprises a text node text 910 comprising a tagged terms 916. The graphical document section 906 comprises drawing element 928. The drawing element 928 comprises a coordinate position 936 and text node text 934 comprising a tagged term 942. The primary document section window 922 comprises a text node edit control 924 displaying a primary document section text node text 966 comprising a graphically differentiated tagged term 952 and graphically differentiated tagged term with modified text term 946. The secondary document section window 926 comprises a text node editor 930 displaying a secondary document section text node text 944. The secondary document section text node text 944 comprises a graphically differentiated tagged term 954 and a graphically differentiated tagged term with modified text term 950. The drawing tool window 912 comprises a drawing canvas panel 914 and a text node editor 932. The drawing canvas panel 914 comprises a rendered graphical document 956 comprising a drawing element 962. The text node editor 932 comprises a drawing element text node text 948 comprising a graphically differentiated tagged term 940. The tagged terms panel 938 comprises a modified text term associated with tagged text node 958 and a text term associated with tagged text node 960. The system for tracking and propagating changes and modifications to tagged text terms 900 may be operated in accordance with the processes described in FIG. 3 and FIG. 10.

Figure 10:
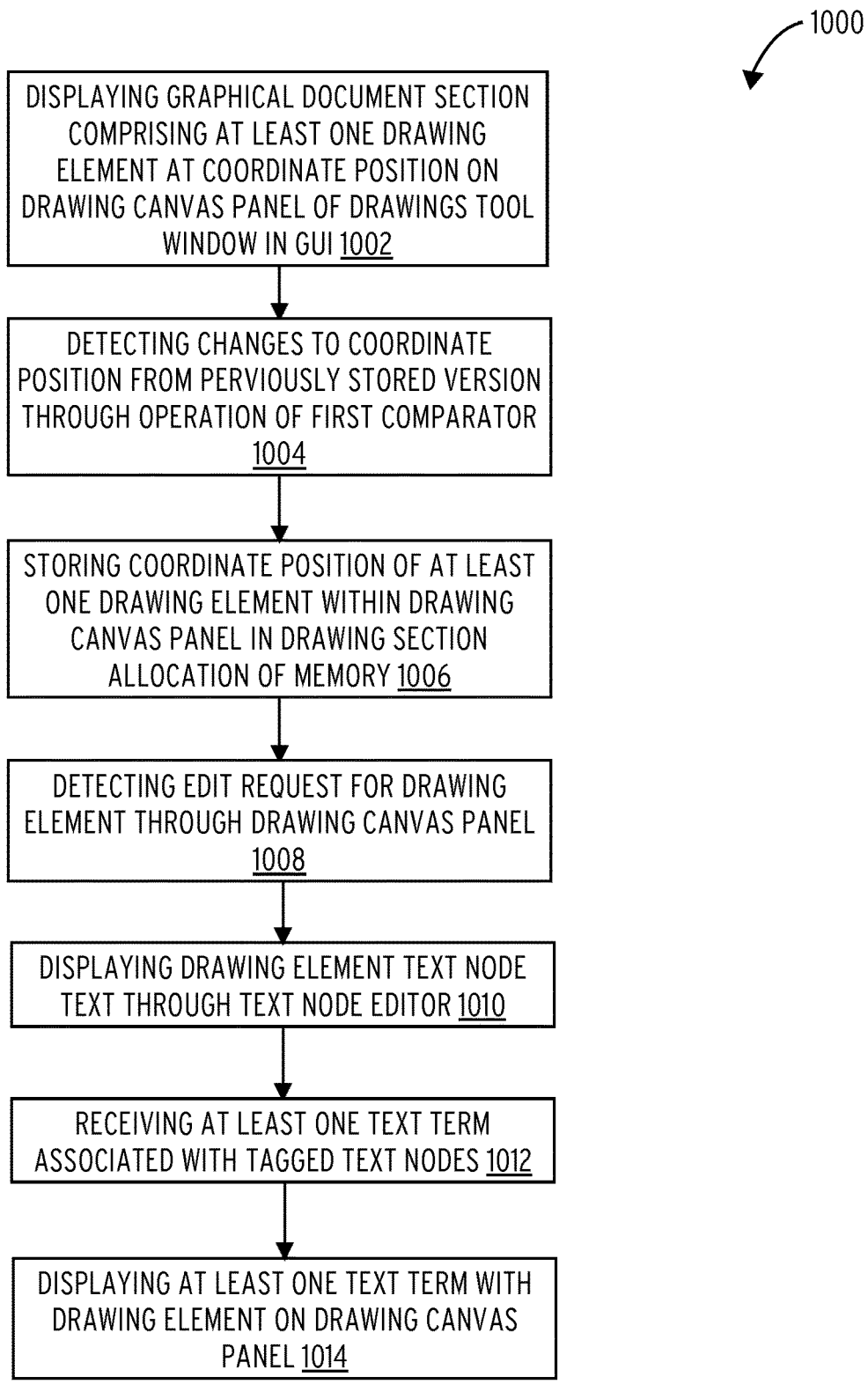
FIG. 10 illustrates an embodiment of a method of tracking and propagating changes and modifications to tagged text terms 1000.

Referencing FIG. 10, a method of tracking and propagating changes and modifications to tagged text terms 1000 displays a graphical document section comprising at least one drawing element at a coordinate position on a drawing canvas panel of a drawings tool window in the GUI (block 1002). A first comparator detects changes to the coordinate position from the perviously stored version (block 1004). The first comparator stores the coordinate position of the at least one drawing element within the drawing canvas panel in the drawing section allocation of memory (block 1006). The drawing canvas panel detects an edit request for a drawing element (block 1008). The text node editor displays drawing element text node text (block 1010). The text node editor receives at least one text term associated with the tagged text nodes (block 1012). The drawing canvas panel displays at least one text term with the drawing element (block 1014).

Figure 11:
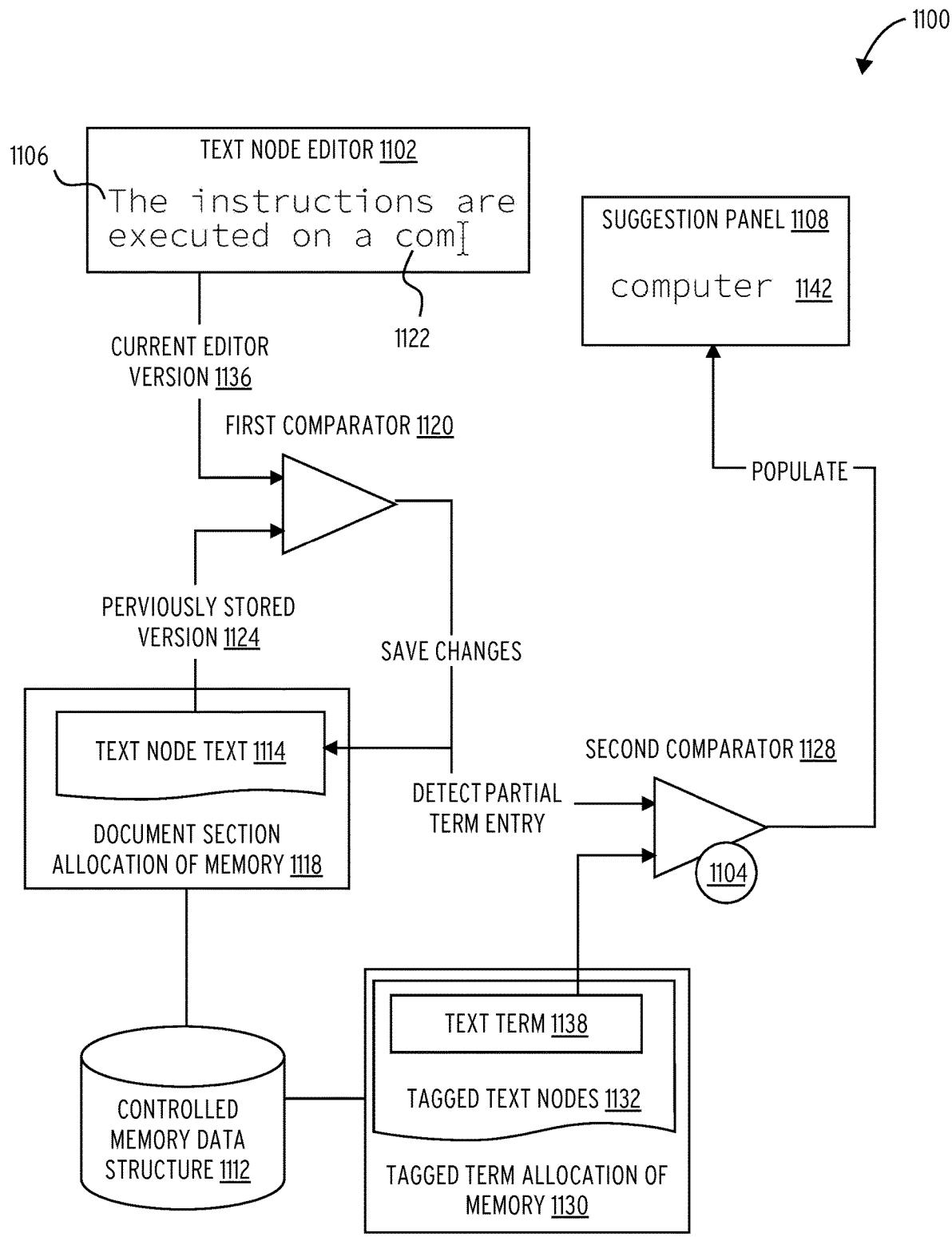
FIG. 11 illustrates an embodiment of a system for tracking and propagating changes and modifications to tagged text terms 1100.

Referencing FIG. 11, a system for tracking and propagating changes and modifications to tagged text terms 1100 comprises a text node editor 1102, a first comparator 1120, a second comparator 1128, a controlled memory data structure 1112 and a suggestion panel 1108. The text node editor 1102 comprises a text node text 1106 with a partial term entry 1122. The suggestion panel 1108 comprises an at least one suggested text term 1142. The controlled memory data structure 1112 comprises a document section allocation of memory 1118 and a tagged term allocation of memory 1130. The document section allocation of memory 1118 comprises text node text 1114. The tagged term allocation of memory 1130 comprises a tagged text nodes 1132 comprising text term 1138. The first comparator 1120 receives a current editor version 1136 of the text node text from the text node editor 1102 and a perviously stored version 1124 of the text node text from the document section allocation of memory 1118. The second comparator 1128 comprises a preconfigured similarity threshold 1104. The system for tracking and propagating changes and modifications to tagged text terms 1100 may be operated in accordance with the process described in FIG. 12.

Figure 12:
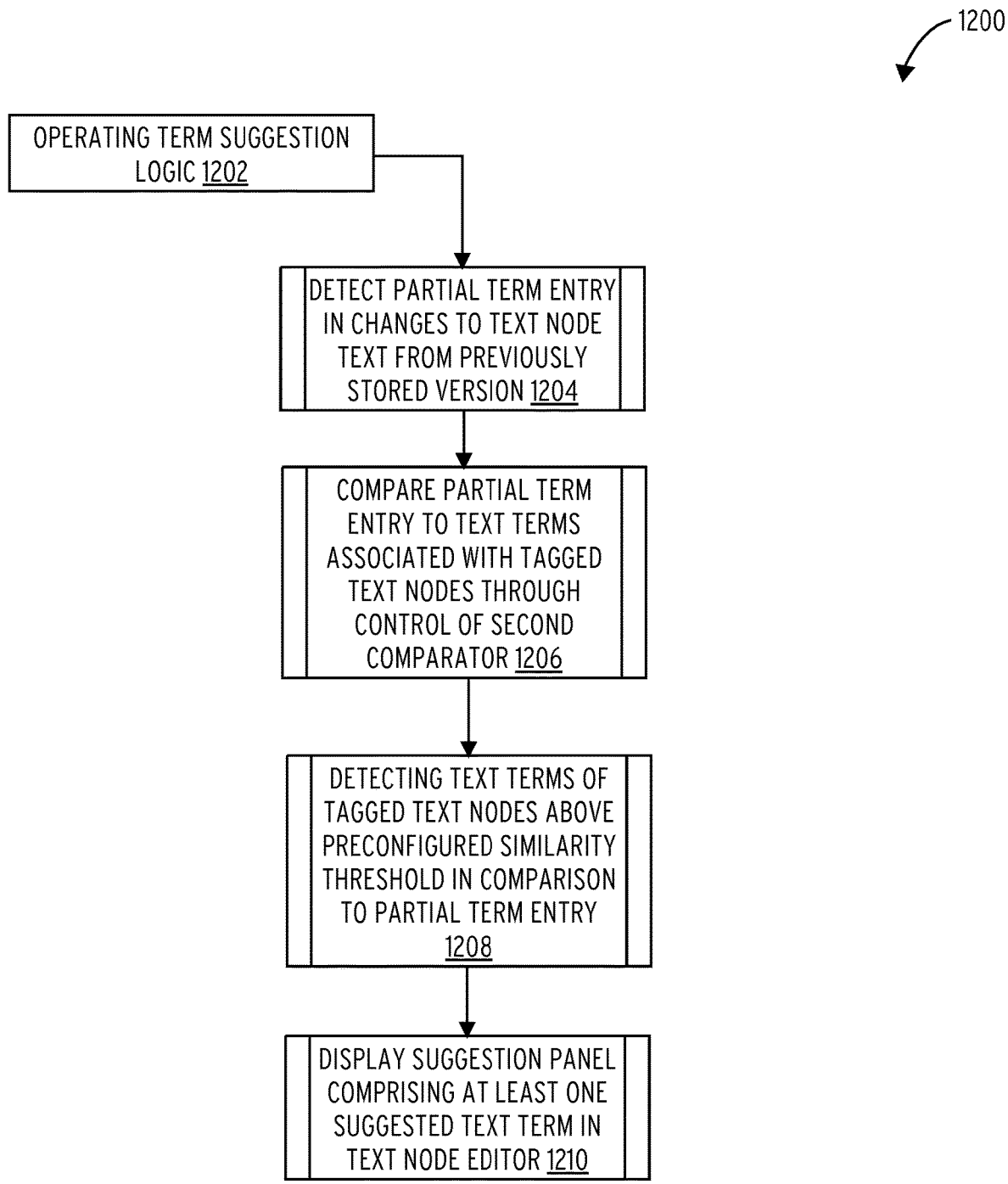
FIG. 12 illustrates an embodiment of a method of tracking and propagating changes and modifications to tagged text terms 1200.

Referencing FIG. 12, a method of tracking and propagating changes and modifications to tagged text terms 1200 operates term suggestion logic (block 1202). The term suggestion logic detects a partial term entry in the changes to the text node text from a previously stored version (subroutine block 1204). A second comparator compares the partial term entry to the text terms associated with the tagged text nodes (subroutine block 1206). The second comparator detects the text terms of the tagged text nodes above a preconfigured similarity threshold in comparison to the partial term entry (subroutine block 1208). The term suggestion logic displays a suggestion panel comprising at least one suggested text term in the text node editor (subroutine block 1210).

Figure 13:
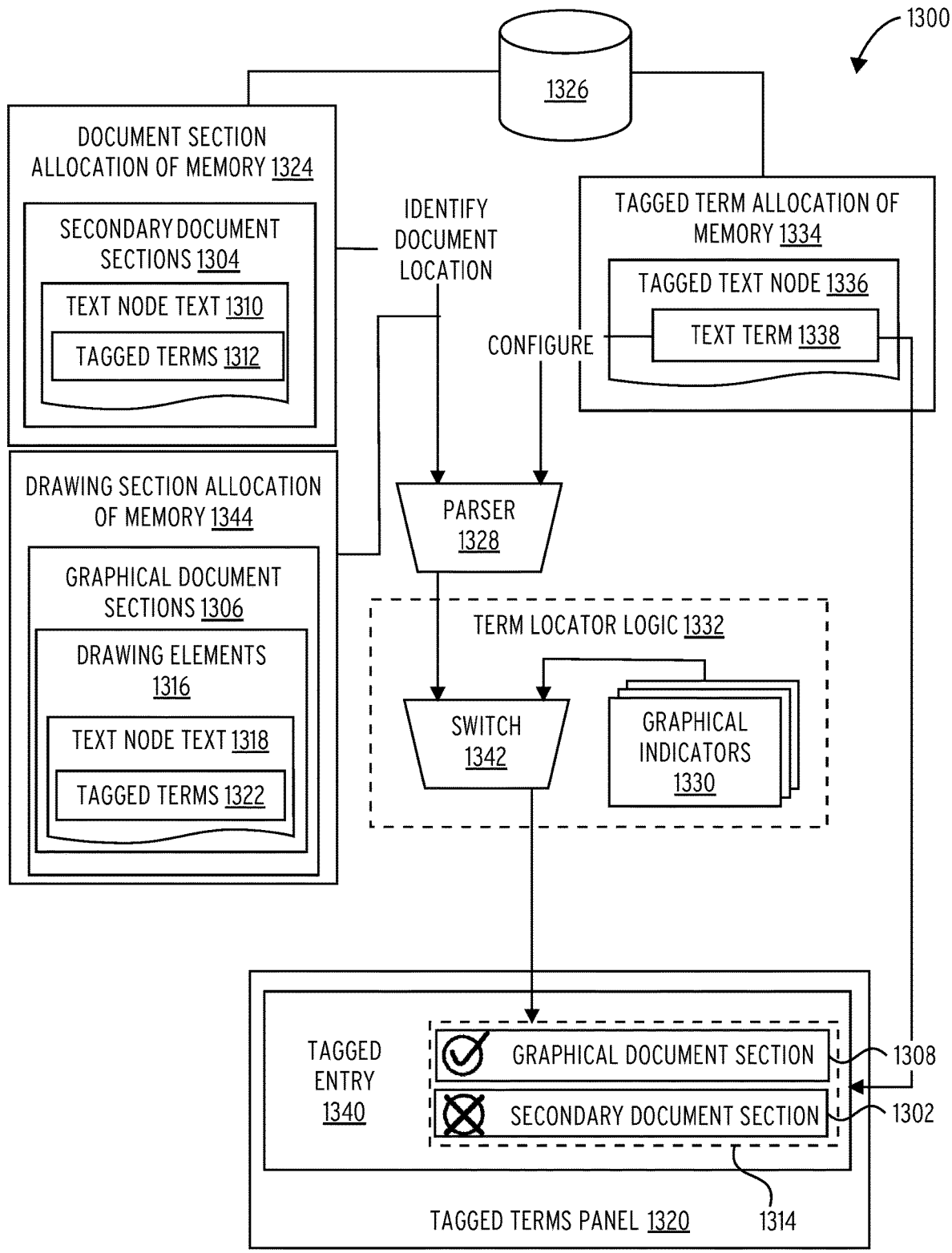
FIG. 13 illustrates an embodiment of a system for tracking and propagating changes and modifications to tagged text terms 1300.

Referencing FIG. 13, a system for tracking and propagating changes and modifications to tagged text terms 1300 comprises a controlled memory data structure 1326, a parser 1328, a term locator logic 1332, and a tagged terms panel 1320 displayed in a GUI. The controlled memory data structure 1326 comprises a document section allocation of memory 1324, a drawing section allocation of memory 1344, and a tagged term allocation of memory 1334. The document section allocation of memory 1324 comprises a secondary document sections 1304. The secondary document sections 1304 comprises a text node text 1310 comprising tagged terms 1312. The drawing section allocation of memory 1344 comprises graphical document sections 1306 comprising a drawing elements 1316. The drawing elements 1316 comprise text node text 1318 comprising tagged terms 1322. The tagged term allocation of memory 1334 comprises tagged text node 1336 comprising text term 1338. The term locator logic 1332 comprises a switch 1342 and graphical indicators 1330. The tagged terms panel 1320 comprises a tagged entry 1340 and a rendered graphical indicator 1314. The rendered graphical indicator 1314 comprises a graphical document location status 1308 and a secondary document location status 1302. The system for tracking and propagating changes and modifications to tagged text terms 1300 may be operated in accordance with the process described in FIG. 14.

Figure 14:
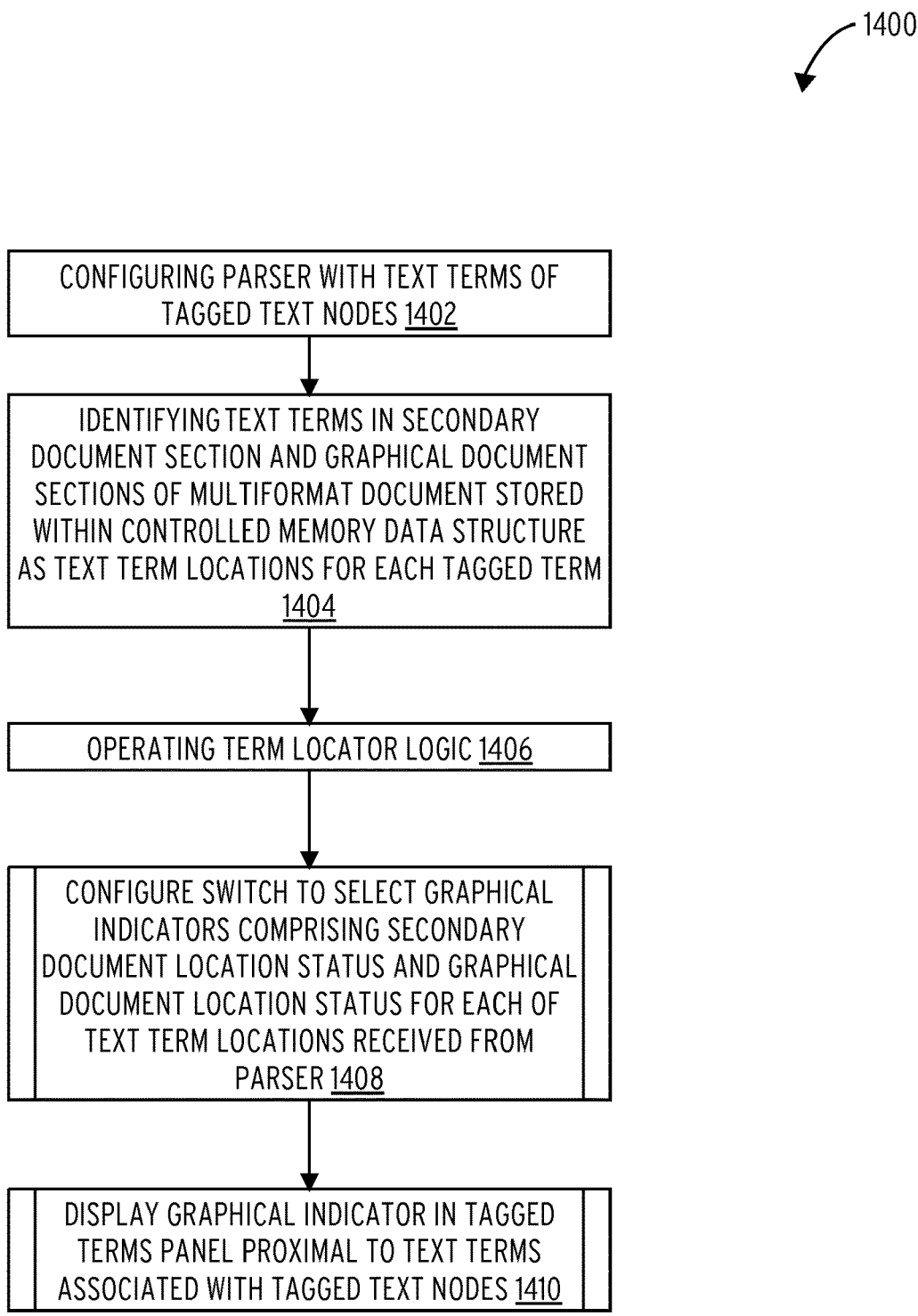
FIG. 14 illustrates an embodiment of a method of tracking and propagating changes and modifications to tagged text terms 1400.

Referencing FIG. 14, a method of tracking and propagating changes and modifications to tagged text terms 1400 configures the parser with the text terms of the tagged text nodes (block 1402). The parser identifies the text terms in a secondary document section and the graphical document sections of a multiformat document stored within the controlled memory data structure as text term locations for each tagged term (block 1404). The method of tracking and propagating changes and modifications to tagged text terms 1400 operates term locator logic (block 1406). The term locator logic configures a switch to select graphical indicators comprising a secondary document location status and a graphical document location status for each of the text term locations received from the parser (subroutine block 1408). The GUI displays a graphical indicator in the tagged terms panel proximal to the text terms associated with the tagged text nodes (subroutine block 1410).

Figure 15:
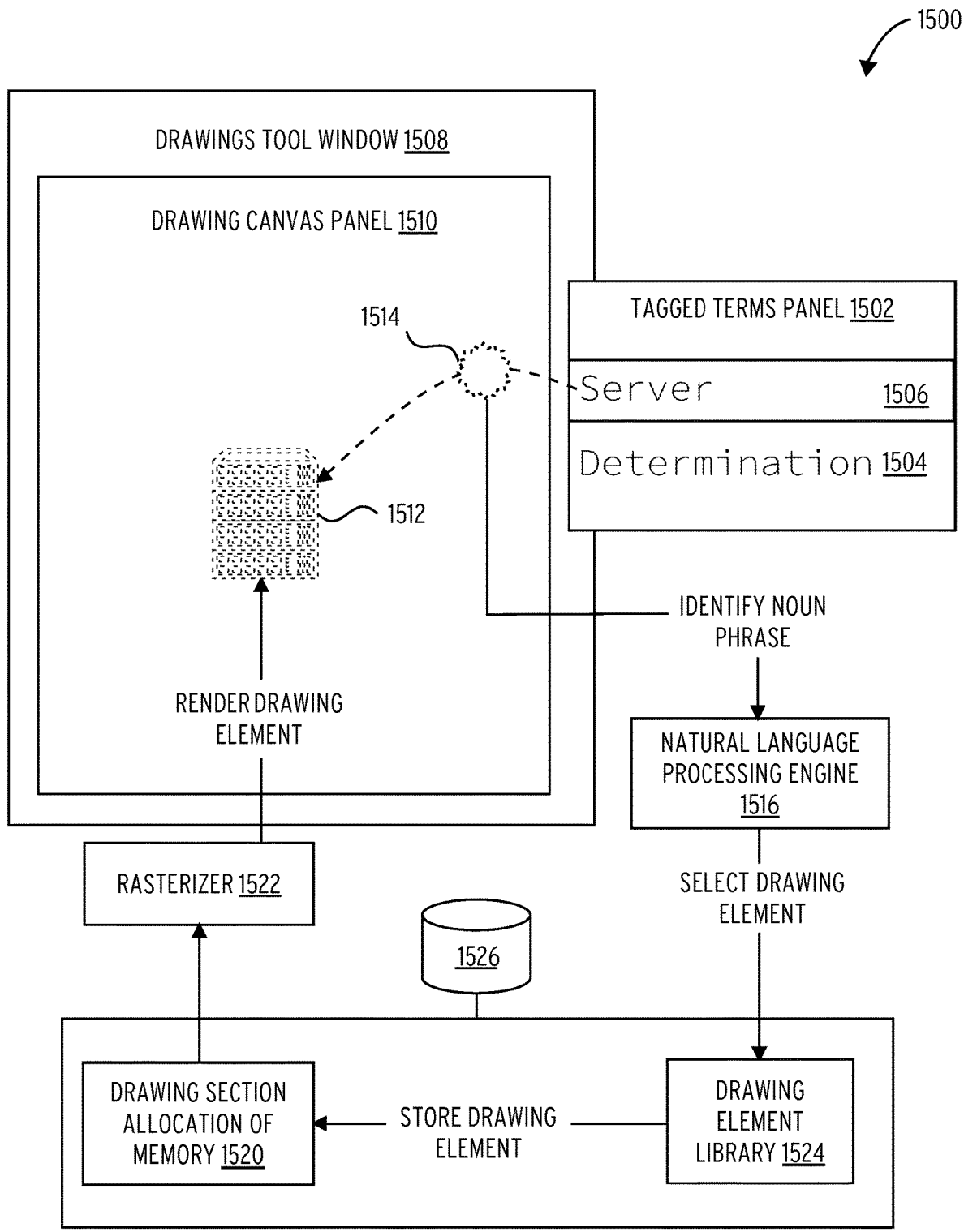
FIG. 15 illustrates an embodiment of a system for tracking and propagating changes and modifications to tagged text terms 1500.

Referencing FIG. 15, a system for tracking and propagating changes and modifications to tagged text terms 1500 comprises a drawings tool window 1508, a tagged terms panel 1502, a controlled memory data structure 1526, a rasterizer 1522, and a natural language processing engine 1516. The drawings tool window 1508 comprises a drawing canvas panel 1510 displaying a system diagram drawing element 1512. The tagged terms panel 1502 comprises a noun phrase 1506 and a verb phrase 1504. The tagged terms panel 1502 receives a drag and drop input 1514 for the noun phrase 1506. The controlled memory data structure 1526 comprises a drawing section allocation of memory 1520 and a drawing element library 1524. The system for tracking and propagating changes and modifications to tagged text terms 1500 may be operated in accordance with the process described in FIG. 16.

Figure 16:
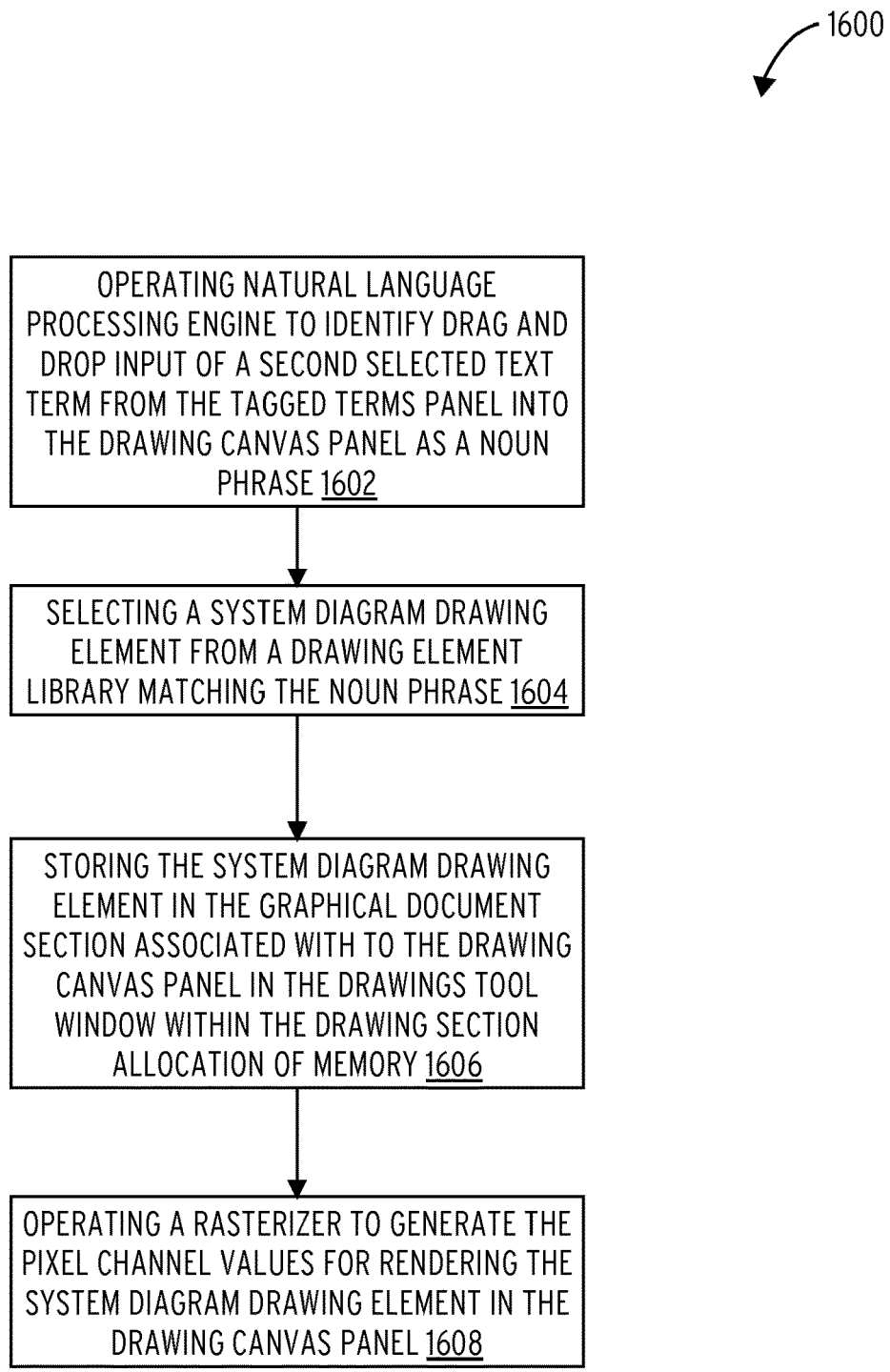
FIG. 16 illustrates an embodiment of a method of tracking and propagating changes and modifications to tagged text terms 1600.

Referencing FIG. 16, a method of tracking and propagating changes and modifications to tagged text terms 1600 operates natural language processing engine to identify drag and drop input of a second selected text term from the tagged terms panel into the drawing canvas panel as a noun phrase (block 1602). The natural language processing engine selects a system diagram drawing element from a drawing element library matching the noun phrase (block 1604). The method of tracking and propagating changes and modifications to tagged text terms 1600 stores the system diagram drawing element in the graphical document section associated with to the drawing canvas panel in the drawings tool window within the drawing section allocation of memory (block 1606). A rasterizer generates the pixel channel values for rendering the system diagram drawing element in the drawing canvas panel (block 1608).

Figure 17:
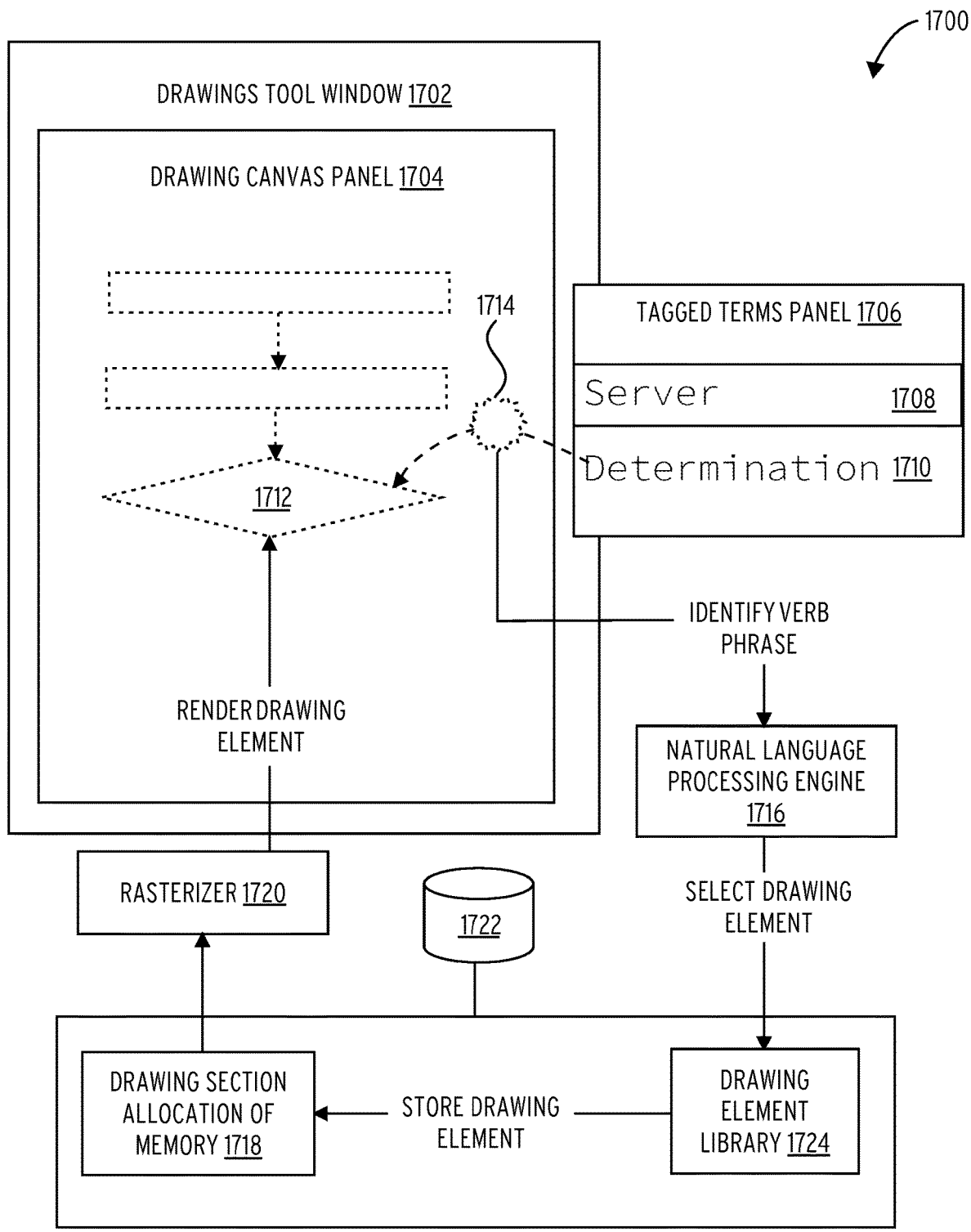
FIG. 17 illustrates an embodiment of a system for tracking and propagating changes and modifications to tagged text terms 1700.

Referencing FIG. 17, a system for tracking and propagating changes and modifications to tagged text terms 1700 comprises a drawings tool window 1702, a tagged terms panel 1706, a controlled memory data structure 1722, a rasterizer 1720, and a natural language processing engine 1716. The drawings tool window 1702 comprises a drawing canvas panel 1704 displaying a flow chart diagram drawing element 1712. The tagged terms panel 1706 comprises a noun phrase 1708 and a verb phrase 1710. The tagged terms panel 1706 receives a drag and drop input 1714 for the verb phrase 1710. The controlled memory data structure 1722 comprises a drawing section allocation of memory 1718 and a drawing element library 1724. The system for tracking and propagating changes and modifications to tagged text terms 1700 may be operated in accordance with the process described in FIG. 18.

Figure 18:
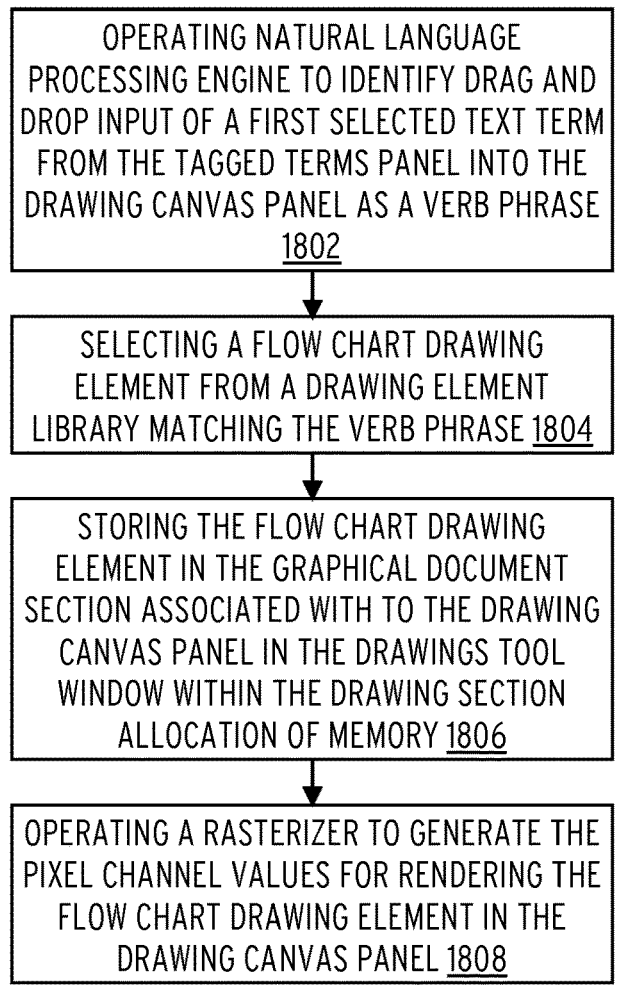
FIG. 18 illustrates an embodiment of a method of tracking and propagating changes and modifications to tagged text terms 1800.

Referencing FIG. 18, a method of tracking and propagating changes and modifications to tagged text terms 1800 operates natural language processing engine to identify drag and drop input of a first selected text term from the tagged terms panel into the drawing canvas panel as a noun phrase (block 1802). The natural language processing engine selects a flow chart diagram drawing element from a drawing element library matching the verb phrase (block 1804). The method of tracking and propagating changes and modifications to tagged text terms 1800 stores the system diagram drawing element in the graphical document section associated with to the drawing canvas panel in the drawings tool window within the drawing section allocation of memory (block 1806). A rasterizer generates the pixel channel values for rendering the flow chart diagram drawing element in the drawing canvas panel (block 1808).

Figure 19:
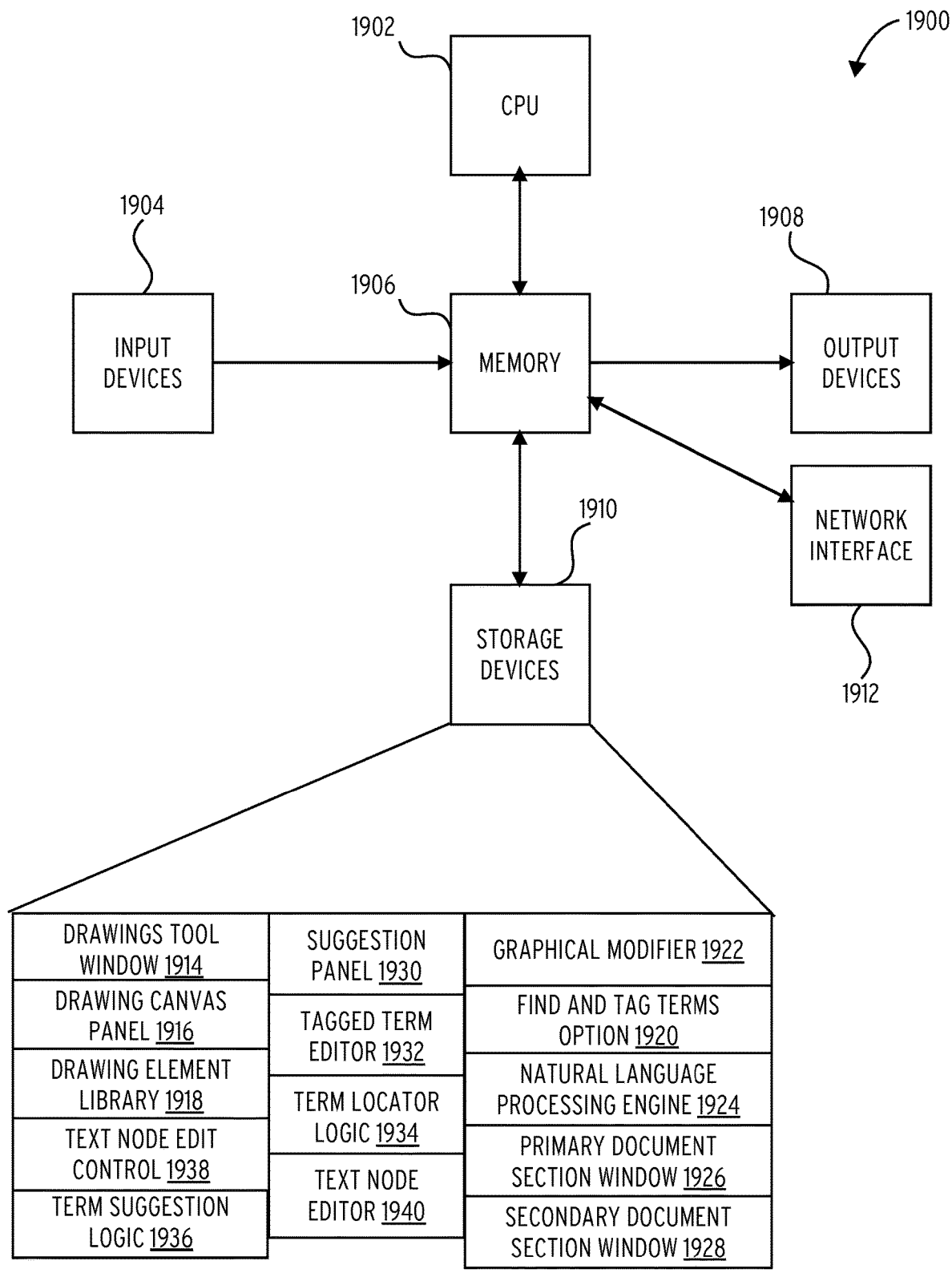
FIG. 19 illustrates an embodiment of a digital apparatus 1900 to implement components and process steps of the system described herein.

FIG. 19 illustrates an embodiment of a digital apparatus 1900 to implement components and process steps of the system described herein.

Input devices 1904 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1904 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1904 are provided via various machine signal conductors (e.g., busses or network interfaces) and circuits to memory 1906.

The memory 1906 is typically what is known as a first or second level memory device, providing for storage (via configuration of matter or states of matter) of signals received from the input devices 1904, instructions and information for controlling operation of the CPU 1902, and signals from storage devices 1910. The storage devices 1910 comprises a drawings tool window 1914, drawing canvas panel 1916, drawing element library 1918, text node edit control 1938, term suggestion logic 1936, suggestion panel 1930, tagged term editor 1932, term locator logic 1934, text node editor 1940, graphical modifier 1922, find and tag terms option 1920, natural language processing engine 1924, primary document section window 1926, and secondary document section window 1928.

Information stored in the memory 1906 is typically directly accessible to the CPU 1902 of the device. Signals input to the device cause the reconfiguration of the internal material/energy state of the memory 1906, creating in essence a new machine configuration, influencing the behavior of the digital apparatus 1900 by affecting the behavior of the CPU 1902 with control signals (instructions) and data provided in conjunction with the control signals.

Second or third level storage devices 1910 may provide a slower but higher capacity machine memory capability. Examples of storage devices 1910 are hard disks, optical disks, large capacity flash memories or other non-volatile memory technologies, and magnetic memories.

The CPU 1902 may cause the configuration of the memory 1906 to be altered by signals in storage devices 1910. In other words, the CPU 1902 may cause data and instructions to be read from storage devices 1910 in the memory 1906 from which may then influence the operations of CPU 1902 as instructions and data signals, and from which it may also be provided to the output devices 1908. The CPU 1902 may alter the content of the memory 1906 by signaling to a machine interface of memory 1906 to alter the internal configuration, and then converted signals to the storage devices 1910 to alter its material internal configuration. In other words, data and instructions may be backed up from memory 1906, which is often volatile, to storage devices 1910, which are often non-volatile.

Output devices 1908 are transducers which convert signals received from the memory 1906 into physical phenomenon such as vibrations in the air, or patterns of light on a machine display, or vibrations (i.e., haptic devices) or patterns of ink or other materials (i.e., printers and 3-D printers).

The network interface 1912 receives signals from the memory 1906 and converts them into electrical, optical, or wireless signals to other machines, typically via a machine network. The network interface 1912 also receives signals from the machine network and converts them into electrical, optical, or wireless signals to the memory 1906.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of " circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

Figure 20:
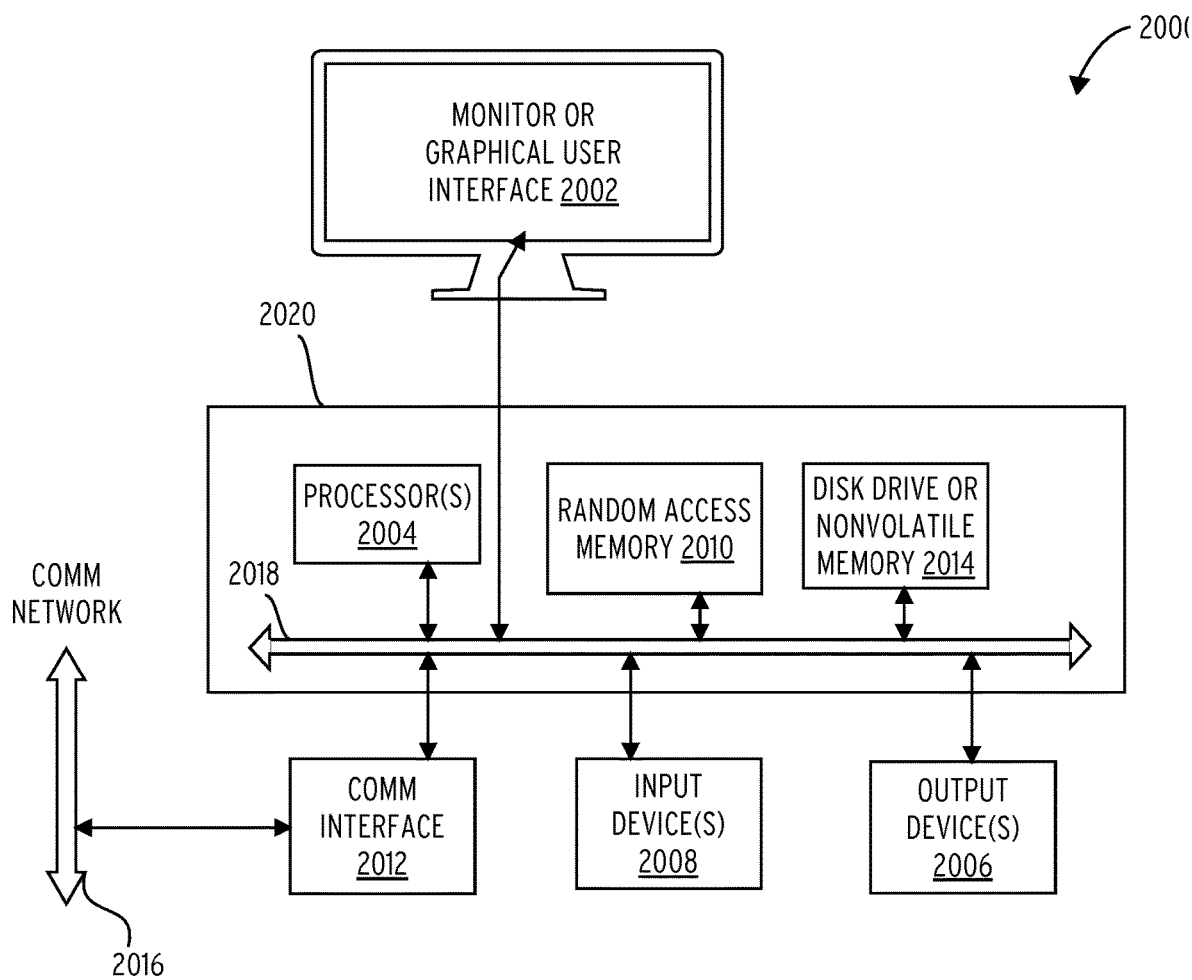
FIG. 20 is an example block diagram of a computer system 2000 that may incorporate embodiments of the present invention.

FIG. 20 is an example block diagram of a computer system 2000 that may incorporate embodiments of the present invention. FIG. 20 is merely illustrative of a machine system to carry out aspects of the technical processes described herein, and does not limit the scope of the claims. One of ordinary skill in the art would recognize other variations, modifications, and alternatives. In one embodiment, the computer system 2000 typically includes a monitor or graphical user interface 2002, a computer 2020, a communication network interface 2012, input device(s) 2008, output device(s) 2006, and the like.

As depicted in FIG. 20, the computer 2020 may include one or more processor(s) 2004 that communicate with a number of peripheral devices via a bus subsystem 2018. These peripheral devices may include input device(s) 2008, output device(s) 2006, communication network interface 2012, and a storage subsystem, such as a random access memory 2010 and a disk drive or nonvolatile memory 2014.

The input device(s) 2008 include devices and mechanisms for inputting information to the computer 2020. These may include a keyboard, a keypad, a touch screen incorporated into the monitor or graphical user interface 2002, audio input devices such as voice recognition systems, microphones, and other types of input devices. In various embodiments, the input device(s) 2008 are typically embodied as a computer mouse, a trackball, a track pad, a joystick, wireless remote, drawing tablet, voice command system, eye tracking system, and the like. The input device(s) 2008 typically allow a user to select objects, icons, text and the like that appear on the monitor or graphical user interface 2002 via a command such as a click of a button or the like.

The output device(s) 2006 include all possible types of devices and mechanisms for outputting information from the computer 2020. These may include a display (e.g., monitor or graphical user interface 2002), non-visual displays such as audio output devices, etc.

The communication network interface 2012 provides an interface to communication networks (e.g., communication network 2016) and devices external to the computer 2020.

The communication network interface 2012 may serve as an interface for receiving data from and transmitting data to other systems. Embodiments of the communication network interface 2012 typically include an Ethernet card, a modem (telephone, satellite, cable, ISDN), (asynchronous) digital subscriber line (DSL) unit, FireWire interface, USB interface, and the like. For example, the communication network interface 2012 may be coupled to the communication network 2016 via a FireWire bus, or the like. In other embodiments, the communication network interface 2012 may be physically integrated on the motherboard of the computer 2020, and may be a software program, such as soft DSL, or the like.

In various embodiments, the computer system 2000 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 2020 inthe processor(s) 2004 may include one or more microprocessors from Intel®. Further, one embodiment, the computer 2020 includes a UNIX-based operating system.

The random access memory 2010 and the disk drive or nonvolatile memory 2014 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 2010 and the disk drive or nonvolatile memory 2014 may be configured to store the basic programming and data constructs that provide the functionality of the disclosed processes and other embodiments thereof that fall within the scope of the present invention.

Software code modules and instructions that implement embodiments of the present invention may be stored in the random access memory 2010 and/or the disk drive or nonvolatile memory 2014. These software modules may be executed by the processor(s) 2004. The random access memory 2010 and the disk drive or nonvolatile memory 2014 may also provide a repository for storing data used by the software modules.

The random access memory 2010 and the disk drive or nonvolatile memory 2014 may include a number of memories including a main random access memory (RAM) for storage of instructions and data during program execution and a read only memory (ROM) in which fixed non-transitory instructions are stored. The random access memory 2010 and the disk drive or nonvolatile memory 2014 may include a file storage subsystem providing persistent (non-volatile) storage for program and data files. The random access memory 2010 and the disk drive or nonvolatile memory 2014 may include removable storage systems, such as removable flash memory.

The bus subsystem 2018 provides a mechanism for letting the various components and subsystems of computer 2020 communicate with each other as intended. Although the communication network interface 2012 is depicted schematically as a single bus, alternative embodiments of the bus subsystem 2018 may utilize multiple busses.

FIG. 20 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 21:
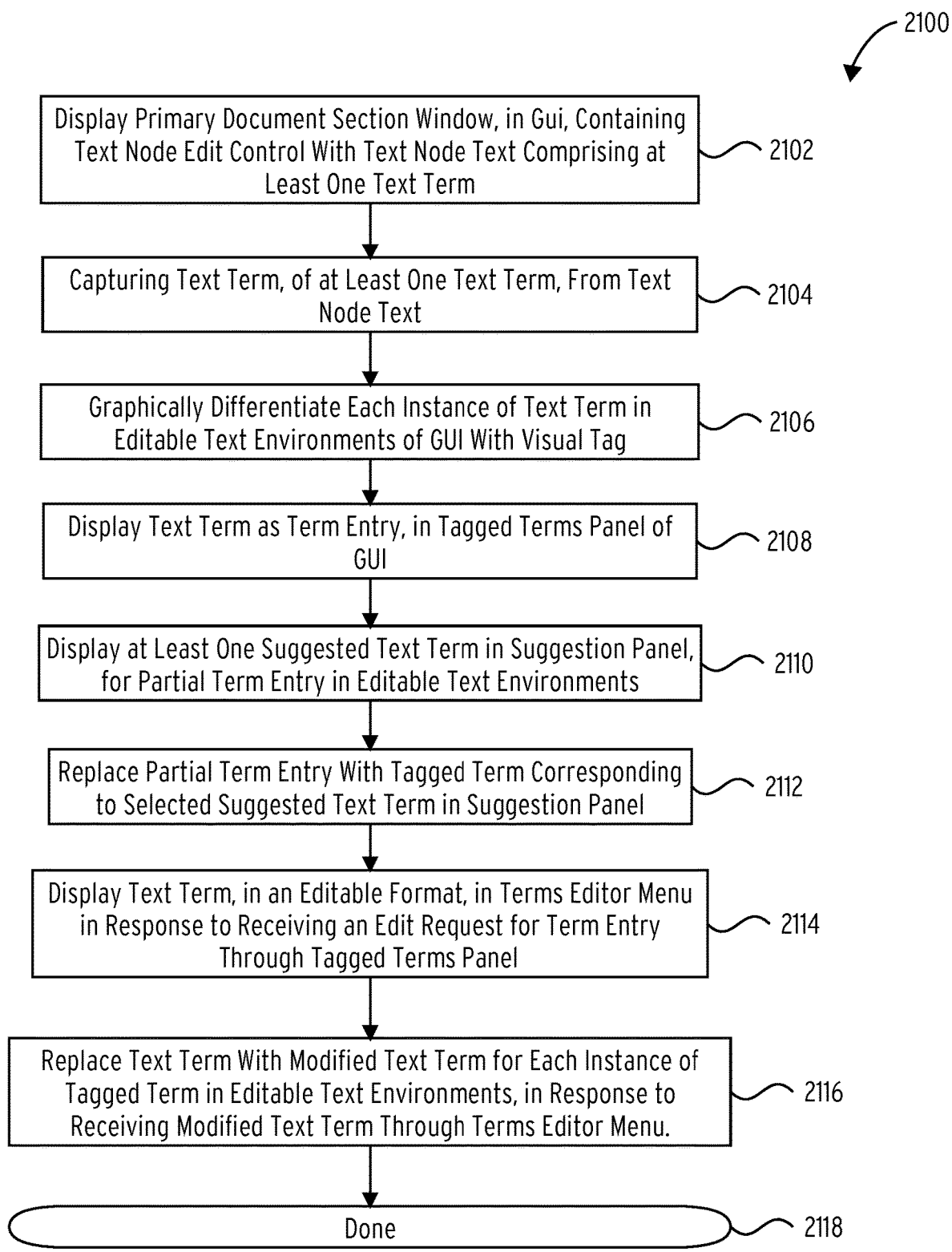
FIG. 21 illustrates an embodiment of a method 2100 of tracking and propagating changes and modifications to tagged text terms across document sections and graphical drawings in a graphical user interface.

Referencing FIG. 21, in block 2102, the method of tracking and propagating changes and modifications to tagged text terms across document sections and graphical document sections in a graphical user interface 2100 displays a primary document section window, in the GUI, containing a text node edit control with text node text comprising at least one text term.

In block 2104, the method of tracking and propagating changes and modifications to tagged text terms across document sections and graphical document sections in a graphical user interface 2100 a text term, of the at least one text term, from the text node text.

In block 2106, the method of tracking and propagating changes and modifications to tagged text terms across document sections and graphical document sections in a graphical user interface 2100 graphically differentiate each instance of the text term in editable text environments of the GUI with a visual tag.

In block 2108, the method of tracking and propagating changes and modifications to tagged text terms across document sections and graphical document sections in a graphical user interface 2100 displays the text term as a term entry, in a tagged terms panel of the GUI.

In block 2110, the method of tracking and propagating changes and modifications to tagged text terms across document sections and graphical document sections in a graphical user interface 2100 displays at least one suggested text term in a suggestion panel, for a partial term entry in the editable text environments In block 2112, the method of tracking and propagating changes and modifications to tagged text terms across document sections and graphical document sections in a graphical user interface 2100 replaces the partial term entry with the tagged term corresponding to a selected suggested text term in the suggestion panel.

In block 2114, the method of tracking and propagating changes and modifications to tagged text terms across document sections and graphical document sections in a graphical user interface 2100 displays the text term, in an editable format, in a terms editor menu in response to receiving an edit request for the term entry through the tagged terms panel.

In block 2116, the method of tracking and propagating changes and modifications to tagged text terms across document sections and graphical document sections in a graphical user interface 2100 replaces replacing the text term with a modified text term for each instance of the tagged term in the editable text environments, in response to receiving the modified text term through the terms editor menu.

In done block 2118, the method of tracking and propagating changes and modifications to tagged text terms across document sections and graphical document sections in a graphical user interface 2100 ends.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. In addition, similar principles as described corresponding to latches and/or flops can be applied to other sequential logic circuit elements. Other modifications and variations will be apparent to those skilled in the art and are intended to fall within the scope of the appended claims.

What is claimed is:

1. A method of tracking and propagating changes and modifications to tagged text terms across document sections and graphical document sections in a graphical user interface (GUI) comprises:
    displaying a primary document section window with a text node edit control within the GUI, comprising text node text with at least one text term, wherein the text node edit control is text node editor;
    storing a text term as a new tagged text node within a tagged term allocation of memory in a controlled memory data structure in response to receiving a tag request through the text node edit control;
    configuring a parser with the new tagged text node to:
        parse the text node text stored in a document section allocation of memory and drawing section allocation of memory within the controlled memory data structure, for text terms matching the new tagged text node; and
        transfer memory sectors associated with matching text terms within the text node text with a modifier value to identify tagged terms through control of a memory controller;
    rendering the text node text stored within the document section allocation of memory and the drawing section allocation of memory through the text node editor in the GUI with modified pixel channel values for the tagged terms through control of a display device;
    displaying a tagged terms panel, comprising the text terms associated with tagged text nodes stored within the tagged term allocation of memory as tagged entries, through the GUI;
    displaying the tagged text nodes associated with a particular text term through a tagged term editor in response receiving an edit request through the tagged terms panel for the particular text term;
    replacing the text term of a particular tagged term in the text node text stored in the controlled memory data structure with a new text term in response to receiving the new text term through the tagged term editor for a tagged text node associated with the particular tagged term;
    storing the text node text from the text node editor to the controlled memory data structure, in response to detecting changes to the text node text from a previously stored version through operation of a first comparator;
    operating term suggestion logic to:
        detect a partial term entry in the changes to the text node text from a previously stored version;
        compare the partial term entry to the text terms associated with the tagged text nodes through control of a second comparator; and
        display a suggestion panel comprising at least one suggested text term in the text node editor, in response to detecting the text terms of the tagged text nodes above a preconfigured similarity threshold in comparison to the partial term entry;
        adding a tagged term to the text node text in the text node editor in response to receiving a selection input for a suggested text term in the suggestion panel; and
    generating a flow chart drawing element in a drawing canvas panel from a drag and drop input of a first selected text term from the tagged terms panel in response to a natural language processing engine interpreting the first selected text term as a verb phrase; and
    generating a system diagram drawing element in the drawing canvas panel from a drag and drop input of a second selected text term from the tagged terms panel, in response to the natural language processing engine interpreting the second selected text term a noun phrase.

2. The method of claim 1 comprises:
    displaying a graphical document section comprising at least one drawing element at a coordinate position on a drawing canvas panel of a drawings tool window in the GUI;
    storing the coordinate position of the at least one drawing element within the drawing canvas panel in the drawing section allocation of memory, in response to detecting changes to the coordinate position from the previously stored version through operation of the first comparator;
    displaying drawing element text node text through the text node editor in response to detecting an edit request for a drawing element through the drawing canvas panel; and displaying at least one text term with the drawing element on the drawing canvas panel in response to receiving at least one text term associated with the tagged text nodes.

3. The method of claim 1, wherein rendering the text node text with the modified pixel channel values for the tagged terms through control of the display device comprises:
  selecting the tagged terms from other text in the text node text by detection of the modifier value through operation of a selector;
  generating character glyphs for the tagged terms and the other text of the text node text through operation of a vectorizer;
  configuring a constructor with display parameters received from the display device to map the character glyphs of the tagged terms and the other text within the text node editor of the GUI;
  generating pixel channel values for the tagged terms and the other text from mapped character glyphs through operation of a rasterizer; and
  configuring a filter with a graphical modifier, stored in the tagged term allocation of memory, and the display parameters to generate the modified pixel channel values for the pixel channel values associated with the tagged terms.

4. The method of claim 1, comprises:
  configuring the parser with the text terms of the tagged text nodes to identify the text terms in a secondary document section and the graphical document sections of a multiformat document stored within the controlled memory data structure as text term locations for each tagged term; and
  operating term locator logic to:
    configure a switch to select graphical indicators comprising a secondary document location status and a graphical document location status for each of the text term locations received from the parser; and
    display a graphical indicator in the tagged terms panel proximal to the text terms associated with the tagged text nodes.

5. The method of claim 1, comprises:
  operating a natural language processing engine to identify new text terms in the text node text displayed within the text node edit control to store as new tagged text nodes, in response to receiving a selection input for a find and tag terms option displayed in the primary document section window.

6. A non-transitory computer-readable storage medium, the computer-readable storage medium including instructions that when executed by a computer, cause the computer to:
  display a primary document section window with a text node edit control within the GUI, comprising text node text with at least one text term, wherein the text node edit control is text node editor;
  store a text term as a new tagged text node within a tagged term allocation of memory in a controlled memory data structure in response to receiving a tag request through the text node edit control;
  configure a parser with the new tagged text node to:
    parse the text node text stored in a document section allocation of memory and drawing section allocation of memory within the controlled memory data structure, for text terms that match the new tagged text node; and
    transform memory sectors associated with matching text terms within the text node text with a modifier value to identify tagged terms through control of a memory controller;
  render the text node text stored within the document section allocation of memory and the drawing section allocation of memory through the text node editor in the GUI with modified pixel channel values for the tagged terms through control of a display device;
  display a tagged terms panel, comprising the text terms associated with tagged text nodes stored within the tagged term allocation of memory as tagged entries, through the GUI;
  display the tagged text nodes associated with a particular text term through a tagged term editor in response receiving an edit request through the tagged terms panel for the particular text term;
  replace the text term of a particular tagged term in the text node text stored in the controlled memory data structure with a new text term in response to receiving the new text term through the tagged term editor for a tagged text node associated with the particular tagged term;
  store the text node text from the text node editor to the controlled memory data structure, in response to detecting changes to the text node text from a previously stored version through operation of a first comparator;
  operate term suggestion logic to:
    detect a partial term entry in the changes to the text node text from a previously stored version;
    compare the partial term entry to the text terms associated with the tagged text nodes through control of a second comparator; and
    display a suggestion panel comprising at least one suggested text term in the text node editor, in response to detecting the text terms of the tagged text nodes above a preconfigured similarity threshold in comparison to the partial term entry;
  add a tagged term to the text node text in the text node editor in response to receiving a selection input for a suggested text term in the suggestion panel; generate a flow chart drawing element in a drawing canvas panel from a drag and drop input of a first selected text term from the tagged terms panel in response to a natural language processing engine interpreting the first selected text term as a verb phrase; and
  generate a system diagram drawing element in the drawing canvas panel from a drag and drop input of a second selected text term from the tagged terms panel, in response to the natural language processing engine interpreting the second selected text term a noun phrase.

7. The computer-readable storage medium of claim 6 comprises: display a graphical document section comprising at least one drawing element at a coordinate position on a drawing canvas panel of a drawings tool window in the GUI;
  store the coordinate position of the at least one drawing element within the drawing canvas panel in the drawing section allocation of memory, in response to detecting changes to the coordinate position from the previously stored version through operation of the first comparator;
  display drawing element text node text through the text node editor in response to detecting an edit request for a drawing element through the drawing canvas panel; and display at least one text term with the drawing element on the drawing canvas panel in response to receiving at least one text term associated with the tagged text nodes.

8. The computer-readable storage medium of claim 6, wherein rendering the text node text with the modified pixel channel values for the tagged terms through control of the display device comprises:
  select the tagged terms from other text in the text node text by detection of the modifier value through operation of a selector;
  generate character glyphs for the tagged terms and the other text of the text node text through operation of a vectorizer;
  configure a constructor with display parameters received from the display device to map the character glyphs of the tagged terms and the other text within the text node editor of the GUI;
  generate pixel channel values for the tagged terms and the other text from mapped character glyphs through operation of a rasterizer; and
  configure a filter with a graphical modifier, stored in the tagged term allocation of memory, and the display parameters to generate the modified pixel channel values for the pixel channel values associated with the tagged terms.

9. The computer-readable storage medium of claim 6, comprises:
  configure the parser with the text terms of the tagged text nodes to identify the text terms in a secondary document section and the graphical document sections of a multiformat document stored within the controlled memory data structure as text term locations for each tagged term; and
  operate term locator logic to:
    configure a switch to select graphical indicators comprising a secondary document location status and a graphical document location status for each of the text term locations received from the parser; and
    display a graphical indicator in the tagged terms panel proximal to the text terms associated with the tagged text nodes.

10. The computer-readable storage medium of claim 6, comprises:
  operate a natural language processing engine to identify new text terms in the text node text displayed within the text node edit control to store as new tagged text nodes, in response to receiving a selection input for a find and tag terms option displayed in the primary document section window.

11. A computing apparatus, the computing apparatus comprising:
  a processor; and
  a memory storing instructions that, when executed by the processor, configure the apparatus to:
    display a primary document section window with a text node edit control within the GUI, comprising text node text with at least one text term, wherein the text node edit control is text node editor;
    store a text term as a new tagged text node within a tagged term allocation of memory in a controlled memory data structure in response to receiving a tag request through the text node edit control;
    configure a parser with the new tagged text node to:
      parse the text node text stored in a document section allocation of memory and drawing section allocation of memory within the controlled memory data structure, for text terms match the new tagged text node; and
      transform memory sectors associated with matching text terms within the text node text with a modifier value to identify tagged terms through control of a memory controller;
    render the text node text stored within the document section allocation of memory and the drawing section allocation of memory through the text node editor in the GUI with modified pixel channel values for the tagged terms through control of a display device;
    display a tagged terms panel, comprising the text terms associated with tagged text nodes stored within the tagged term allocation of memory as tagged entries, through the GUI;
    display the tagged text nodes associated with a particular text term through a tagged term editor in response receiving an edit request through the tagged terms panel for the particular text term;
    replace the text term of a particular tagged term in the text node text stored in the controlled memory data structure with a new text term in response to receiving the new text term through the tagged term editor for a tagged text node associated with the particular tagged term;
    store the text node text from the text node editor to the controlled memory data structure, in response to detecting changes to the text node text from a previously stored version through operation of a first comparator;
    operate term suggestion logic to:
      detect a partial term entry in the changes to the text node text from a previously stored version;
      compare the partial term entry to the text terms associated with the tagged text nodes through control of a second comparator;
      display a suggestion panel comprising at least one suggested text term in the text node editor, in response to detecting the text terms of the tagged text nodes above a preconfigured similarity threshold in comparison to the partial term entry; and
      add a tagged term to the text node text in the text node editor in response to receiving as election input for a suggested text term in the suggestion panel;
    generate a flow chart drawing element in a drawing canvas panel from a drag and drop input of a first selected text term from the tagged terms panel in response to a natural language processing engine interpreting the first selected text term as a verb phrase; and
    generate a system diagram drawing element in the drawing canvas panel from a drag and drop input of a second selected text term from the tagged terms panel, in response to the natural language processing engine interpreting the second selected text term a noun phrase.

12. The computing apparatus of claim 11 comprises:
  display a graphical document section comprising at least one drawing element at a coordinate position on a drawing canvas panel of a drawings tool window in the GUI;
  store the coordinate position of the at least one drawing element within the drawing canvas panel in the drawing section allocation of memory, in response to detecting changes to the coordinate position from the previously stored version through operation of the first comparator;

display drawing element text node text through the text node editor in response to detecting an edit request for a drawing element through the drawing canvas panel; and display at least one text term with the drawing element on the drawing canvas panel in response to receiving at least one text term associated with the tagged text nodes.

13. The computing apparatus of claim 11, wherein rendering the text node text with the modified pixel channel values for the tagged terms through control of the display device comprises:

select the tagged terms from other text in the text node text by detection of the modifier value through operation of a selector;

generate character glyphs for the tagged terms and the other text of the text node text through operation of a vectorizer;

configure a constructor with display parameters received from the display device to map the character glyphs of the tagged terms and the other text within the text node editor of the GUI;

generate pixel channel values for the tagged terms and the other text from mapped character glyphs through operation of a rasterizer; and configure a filter with a graphical modifier, stored in the tagged term allocation of memory, and the display parameters to generate the modified pixel channel values for the pixel channel values associated with the tagged terms.

14. The computing apparatus of claim 11, comprises:

configure the parser with the text terms of the tagged text nodes to identify the text terms in a secondary document section and the graphical document sections of a multiformat document stored within the controlled memory data structure as text term locations for each tagged term; and operate term locator logic to:

configure a switch to select graphical indicators comprising a secondary document location status and a graphical document location status for each of the text term locations received from the parser; and display a graphical indicator in the tagged terms panel proximal to the text terms associated with the tagged text nodes.

15. The computing apparatus of claim 11, comprises:

operate a natural language processing engine to identify new text terms in the text node text displayed within the text node edit control to store as new tagged text nodes, in response to receiving a selection input for a find and tag terms option displayed in the primary document section window.

* * * * *